(12) United States Patent
Mao et al.

(10) Patent No.: US 9,750,102 B1
(45) Date of Patent: Aug. 29, 2017

(54) SWITCH CURRENT CONTROL TO SHAPE INPUT CURRENT

(71) Applicant: POWER INTEGRATIONS, INC., San Jose, CA (US)

(72) Inventors: Mingming Mao, Saratoga, CA (US); Tiziano Pastore, Los Gatos, CA (US); Ricardo Luis Janezic Pregitzer, Campbell, CA (US); Antonius Jacobus Johannes Werner, Cambridge (GB); Matthew David Waterson, Cambridge (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/092,445

(22) Filed: Apr. 6, 2016

(51) Int. Cl.
*H05B 33/08* (2006.01)

(52) U.S. Cl.
CPC ..... *H05B 33/0851* (2013.01); *H05B 33/0815* (2013.01)

(58) Field of Classification Search
CPC ............ H05B 33/0815; H05B 33/0818; H05B 33/0884; H05B 33/0809; H05B 33/0848; H05B 33/0896; H05B 37/0245; H05B 37/0254; H05B 33/0803; H05B 37/0272; H05B 33/0857; H05B 33/0851
USPC .... 315/210, 200 R, 297, 307, 224, 228, 244
See application file for complete search history.

(56) References Cited

U.S. PATENT DOCUMENTS

| | | | | |
|---|---|---|---|---|
| 2010/0156319 | A1* | 6/2010 | Melanson | H05B 33/0839 315/297 |
| 2012/0049752 | A1* | 3/2012 | King | H05B 33/0815 315/210 |
| 2013/0002163 | A1* | 1/2013 | He | H05B 33/0815 315/228 |
| 2013/0181630 | A1* | 7/2013 | Taipale | H05B 37/0263 315/224 |
| 2014/0049173 | A1* | 2/2014 | Le | H05B 33/0815 315/200 R |
| 2014/0265897 | A1* | 9/2014 | Taipale | H05B 37/02 315/200 R |
| 2015/0035450 | A1 | 2/2015 | Werner | |
| 2015/0312982 | A1* | 10/2015 | Melanson | H05B 33/0815 315/287 |
| 2016/0190941 | A1* | 6/2016 | Kuang | H02M 3/33507 363/21.01 |

\* cited by examiner

*Primary Examiner* — Douglas W Owens
*Assistant Examiner* — Syed M Kaiser
(74) *Attorney, Agent, or Firm* — Christensen O'Connor Johnson Kindness PLLC

(57) ABSTRACT

A controller for use in a power converter includes a first edge detection circuit that receives a first input sense signal representative of an input of the power converter coupled to a dimmer circuit, and generates a first edge detection signal in response to the first input sense signal. A shaping circuit receives the first edge detection signal from the first edge detection circuit. The shaping circuit generates a first shape signal in response to the first edge detection signal. A drive circuit receives the first shape signal and a feedback signal representative of an output of the power converter. The drive circuit generates the drive signal in response to the feedback signal to control switching of a power switch of the power converter. The drive circuit switches the power switch in a first higher current mode for a first duration in response to the first shape signal.

28 Claims, 11 Drawing Sheets

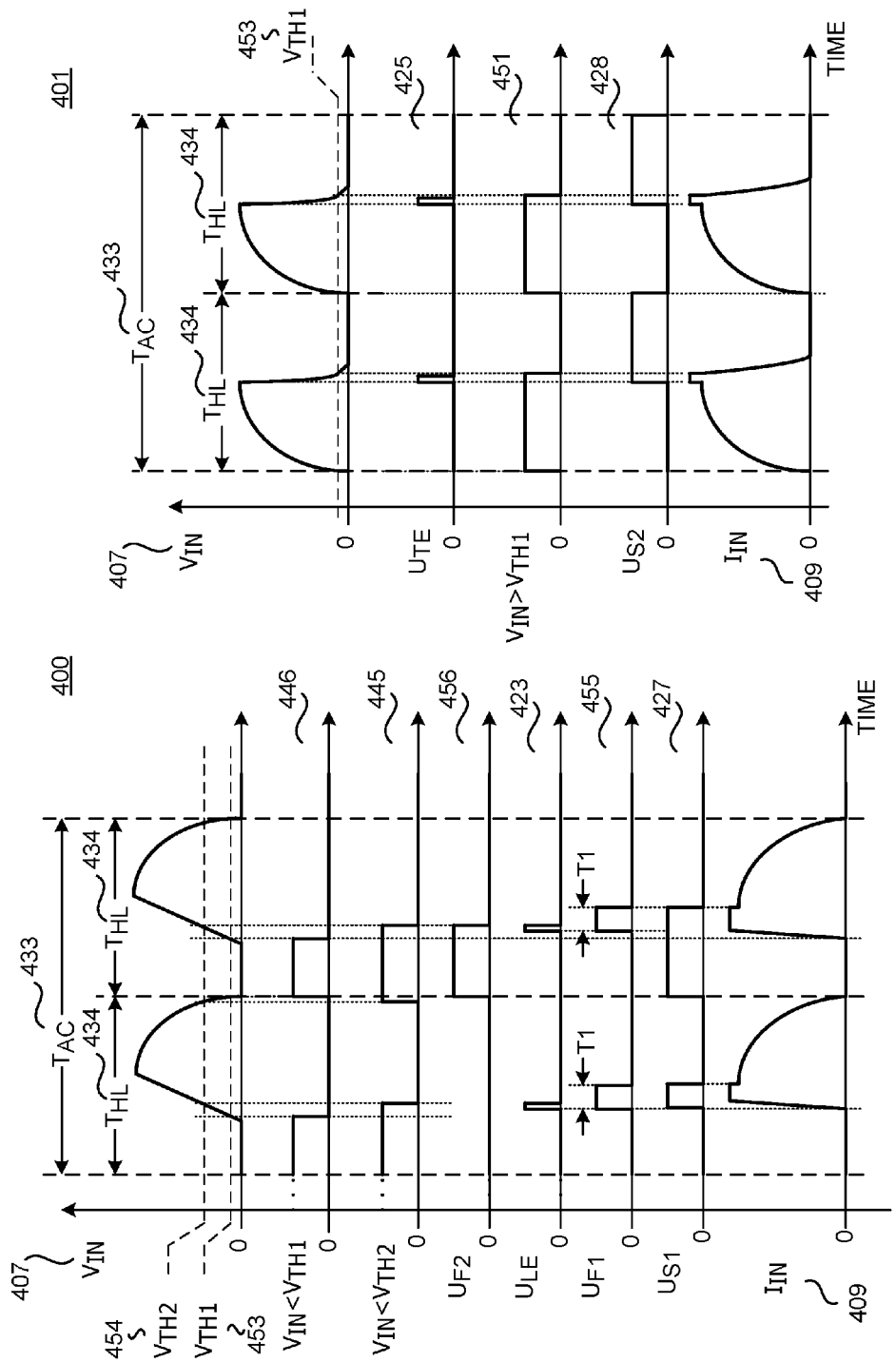

SWITCH CURRENT CONTROL TO SHAPE INPUT CURRENT

BACKGROUND INFORMATION

Field of the Disclosure

The present invention relates generally to power converters, and more specifically to power converters utilized with dimmer circuits.

Background

Residential and commercial lighting applications often include TRIAC dimmers. A TRIAC dimmer circuit typically disconnects a portion of an ac input voltage to limit the amount of voltage and current supplied to an incandescent lamp. This is known as phase dimming because it is often convenient to designate the position of the TRIAC dimmer circuit and the resultant amount of missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the TRIAC dimmer circuit disconnects. As such, removal of a quarter of the ac input voltage in a half line cycle may correspond to a phase angle of 45 degrees. On the other hand, the conduction angle is a measure of how many degrees (from a reference of zero degrees) of each half line cycle the TRIAC dimmer circuit does not disconnect a portion of the ac input voltage. Or in other words, the conduction angle is a measure of how many degrees of each half line cycle in which the TRIAC dimmer circuit is conducting. In one example, the removal of a quarter of the ac input voltage in a half line cycle may correspond to a phase angle of 45 degrees but a conduction angle of 135 degrees.

Although phase angle dimming works well with incandescent lamps that receive the altered ac input voltage directly, it typically creates problems for light emitting diode (LED) lamps. LED lamps often require a regulated power converter to provide regulated current and voltage from the ac power line. Most LEDs and LED modules are best driven by a regulated current, which a regulated power converter may provide from an ac power line. TRIAC dimmer circuits typically don't work well with conventional regulated power converter controllers and consequently may cause flickering or shimmering of the LED lamp with large conduction angles and flashing of the LED lamp at low conduction angles.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4A is timing diagram illustrating various signals of the controller of FIG. 3B when a leading edge dimmer circuit is utilized in accordance with an example of the present invention.

FIG. 4B is timing diagram illustrating various signals of the controller of FIG. 3B when a trailing edge dimmer circuit is utilized in accordance with an example of the present invention.

Figure 1:
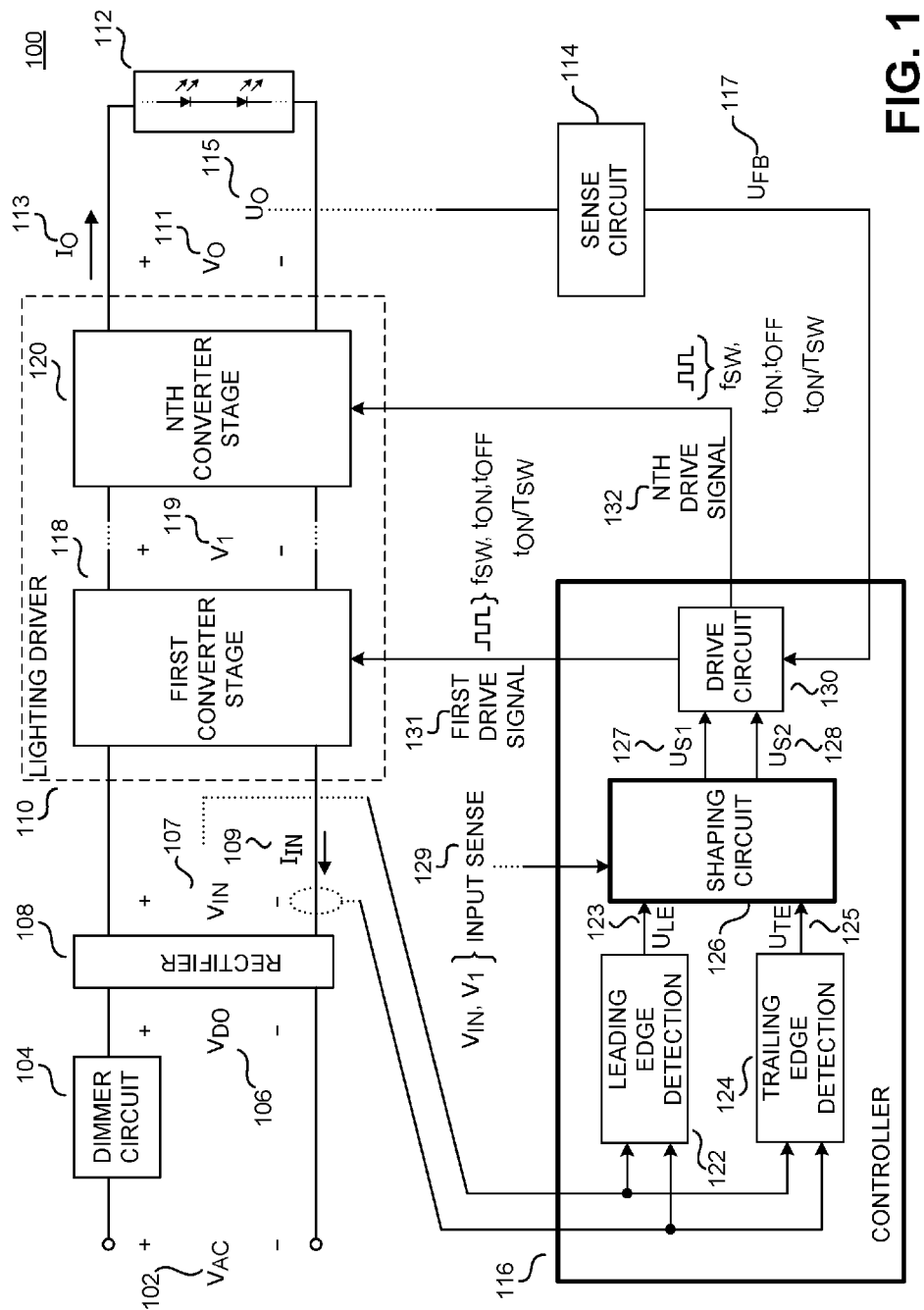
FIG. 1 is a functional block diagram illustrating an example lighting system utilizing a driver with multiple power converters and a controller in accordance with an example of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For phase dimming applications, including those for light emitting diodes (LEDs), a phase dimmer circuit typically disconnects a portion of the ac input voltage at every half line cycle to limit the amount of voltage and current supplied to the LEDs. Typically the phase angle is a measure of how many degrees of each half line cycle the dimmer circuit has disconnected the input. Alternatively, the amount of the ac input voltage that the dimmer circuit does not disconnect the input may be referred to as the conduction angle. In one example, the conduction angle (or phase angle) may be measured by threshold detection where the input voltage may be compared to a reference threshold. The length of time that the input voltage is above a reference threshold in a half line cycle may correspond to the conduction angle of the dimmer circuit and the amount of time that the input voltage is below the reference in a half line cycle may correspond to the phase angle. The amount of dimming wanted may be inferred from the conduction angle and the phase angle. The smaller the conduction angle (or the greater the phase angle), the more dimming is requested.

Further, when a dimmer circuit is utilized, an "edge" may be observed in the waveform of input voltage of the power supply. For a leading edge dimmer circuit, in general, the input voltage is substantially zero until the dimmer circuit conducts and the input voltage rapidly increases and follows the ac input voltage. For a trailing edge dimmer circuit, the input voltage substantially follows the ac input voltage until the dimmer circuit does not conduct and the input voltage rapidly decreases to substantially zero. The rapid increase or decrease may be referred to as an edge. Determining when an edge occurs during a half line cycle may also be used to measure the conduction angle (or phase angle).

One example of a phase dimming circuit is a TRIAC dimmer. A TRIAC is a semiconductor component that behaves as a controlled ac switch. In other words, it behaves as an open switch to an ac voltage until it receives a trigger signal at a control terminal, which causes the switch to close. The TRIAC begins conducting when the current through the switch is above a value referred to as a latching current. The switch remains closed as long as the current through the switch is above a value referred to as the holding current. The amount of current used by power converters to drive LED lamps may not provide enough current to keep a TRIAC conducting for the expected portion of the ac line period. Power converter designs for an LED lamp may include a dummy load, sometimes called a bleeder circuit, to provide enough additional current for the input of the power converter to keep the TRIAC conducting. In other words, the bleeder circuit may also be used to keep the current through the TRIAC above the holding current. In addition, the bleeder circuit may also be used to ensure there is sufficient latching current to initially turn on the TRIAC. Bleeder circuits may include a resistor that conducts (and therefore dissipates power) while a voltage is present. As such, using a bleeder circuit to provide the latching current may affect the efficiency of the overall power conversion system.

For a trailing edge dimmer circuit, the input voltage substantially follows the ac input voltage until the dimmer circuit does not conduct and the input voltage decreases to substantially zero. As mentioned above, the conduction angle may be detected utilizing threshold detection. As such, the faster the input voltage can decrease to substantially zero once the dimmer circuit stops conducting, the more accurate the measured conduction angle is. However, leakage current of the dimmer circuit in its off-state may prevent the voltage across the power converter input capacitors (and as such, the input voltage) from falling to substantially zero and may lead to an inaccurate measurement of the conduction angle.

A power converter designed to respond to a dimmer circuit may determine the amount of dimming set by the dimmer circuit, the type of dimming (leading or trailing edge) and control the amount of voltage and current supplied to the LEDs. The power converter usually provides output regulation by sensing one or more inputs representative of one or more output quantities and controlling the output in a closed loop. In operation, a power switch is utilized to provide the desired output by varying the duty ratio (typically the ratio of the on-time of the power switch to the total switching period), varying the switching frequency, or varying the number of pulses per unit time of the power switch in the power converter. The power switch is generally controlled by a controller.

Embodiments of the present invention may reshape the input current of the power converter when an edge is detected or will soon be detected. By reshaping the input current, the power converter may ensure there is sufficient latching current to initially turn on the dimmer circuit or improve the accuracy of conduction angle detection by discharging the power converter input capacitors. Further, reshaping the input current may also enable the power converter to detect a trailing edge. In one example, the input current may be reshaped by increasing the input current when an edge is detected or will soon be detected.

In one example, the input current may be reshaped by varying the power switch current of the power converter. The switch current (and as such the input current) may be varied by varying the switching frequency, duty ratio, or both. To increase the input current, the power switch may be controlled to increase the switch current by increasing the duty ratio of the power switch, the switching of the power switch, or both. For leading edge dimming, where sufficient latching current is needed to turn on the dimmer circuit, the switch current may be increased (by varying the switching frequency, duty ratio, or both) when an edge is detected or will soon be detected. As such the input current of the power converter is also increased and the latching current is met. For trailing edge dimming, increasing the switch current (by varying the switching frequency, duty ratio, or both) facilitates the discharging of the power converter input capacitors that allows the input voltage of the power converter to fall substantially to zero faster.

For instance, as will be shown, one example of a controller for use in a power converter in accordance with the teachings of the present invention includes a first edge detection circuit that is coupled to receive a first input sense signal. The first input signal is representative of an input of the power converter, which is coupled to a dimmer circuit. The first edge detection circuit is coupled to generate a first edge detection signal in response to the first input sense signal. The controller also includes a shaping circuit that is coupled to receive the first edge detection signal from the first edge detection circuit. The shaping circuit is coupled to generate a first shape signal in response to the first edge detection signal. A drive circuit is coupled to receive the first shape signal from the shaping circuit and a feedback signal that is representative of an output of the power converter. The drive circuit is coupled to generate a drive signal in response to the feedback signal to control switching of a power switch of the power converter to control a transfer of energy from the input of the power converter to the output of the converter. The drive circuit is further coupled to switch the power switch in a first higher current mode for a first duration in response to the first shape signal. In one example, the controller also includes a second edge detection circuit that is coupled to receive the first input sense signal. The second edge detection circuit is coupled to generate a second edge detection signal in response to the first input sense signal. The shaping circuit is also coupled to receive the second edge detection signal from the second edge detection circuit. The shaping circuit is coupled to generate a second shape signal in response to the second edge detection signal. The drive circuit is further coupled to receive the second shape signal from the shaping circuit, and switch the power switch in a second higher current mode for a second duration in response to second shape signal.

To illustrate, FIG. 1 depicts an example lighting system 100 that reshapes the input current when an edge has been detected or will soon be detected in accordance with the teachings of the present invention. The lighting system 100 is shown including an ac input voltage VAC 102, a dimmer circuit 104, a rectifier 108, a lighting driver 110 (such as an LED driver), a load 112, a sense circuit 114, and a controller 116. As shown, the lighting driver 110 may include N converter stages such as first power converter 118 to NTH power converter 120. The controller 116 is shown as including a leading edge detection circuit 122, a trailing edge detection circuit 124, a shaping circuit 126, and a drive circuit 130. Further shown in FIG. 1 is a dimmer output voltage $V_{DO}$ 106, an input voltage $V_{IN}$ 107, an input current $I_{IN}$ 109, an output voltage $V_O$ 111, an output current $I_O$ 113, an output quantity $U_O$ 115, a feedback signal $U_{FB}$ 117, a voltage $V_1$ 119, a leading edge signal $U_{LE}$ 123, a trailing edge signal $U_{TE}$ 125, a first shape signal $U_{S1}$ 127, a second shape signal $U_{S2}$ 128, an input sense signal 129, a first drive signal 131, and an NTH drive signal 132. It should be appreciated that any converter topology (such as a flyback or buck converter) may be used for the power converter stages of the lighting driver 110 and different topologies may be used for different stages.

The lighting system 100 provides output power to the load 112 from an unregulated ac input voltage $V_{AC}$ 102. In one embodiment, the load 112 may be a light emitting diode (LED) array. As shown, the dimmer circuit 104 receives the ac input voltage $V_{AC}$ 102 and produces the dimmer output voltage $V_{DO}$ 106. The dimmer circuit 104 may be utilized to limit the voltage delivered to the lighting driver 110. In one example, the dimmer circuit 104 may be a phase dimming circuit such as a TRIAC phase dimmer. The dimmer circuit 104 further couples to the rectifier 108 and the dimmer output voltage $V_{DO}$ 106 is received by the rectifier 108. The rectifier 108 outputs the input voltage $V_{IN}$ 107 and input current $I_{IN}$ 109. In one embodiment, rectifier 108 may be a bridge rectifier. The rectifier 108 further couples to the lighting driver 110.

As illustrated, the lighting driver 110 receives the input voltage $V_{IN}$ 107 and input current $I_{IN}$ 109 and provides an output to the load 112. The output provided to the load 112 may be provided as either a regulated output voltage $V_O$ 111, regulated output current $I_O$ 113, or a combination of the two. In one embodiment, the load 112 may be a light emitting diode (LED) array. The lighting driver 110 is shown as including N number of power converter stages. The first power converter stage 118 is coupled to receive the input voltage $V_{IN}$ 107 and output the voltage $V_1$ 119. As shown, the NTH power converter stage 120 is the last power converter stage of the lighting driver 110 and provides the output to the load 112, which may be either the regulated output voltage $V_O$ 111, regulated output current $I_O$ 113, or a combination of the two. The power converter stages may include dc-dc converters. In some examples, the power converter stages may include a power switch that switches to control the transfer of energy through an energy transfer element. Example of a power switch may include a metal-oxide semiconductor field-effect transistor (MOSFET), insulated gate bipolar transistor (IGBT), high-electron-mobility transistor (HEMT), bipolar junction transistor (BJT), etc. These power switches are commonly made using semiconductor materials such as silicon, silicon carbide, gallium nitride, or other similar semiconductor materials. The power converter stages may also include an output capacitor for filtering the output provided by each respective stage.

The lighting system 100 further comprises circuitry to regulate the output, exemplified as output quantity $U_O$ 115. In general, the output quantity $U_O$ 115 is either an output voltage $V_O$ 111, an output current $I_O$ 113, or a combination of the two. A sense circuit 114 is coupled to sense the output quantity $U_O$ 115 and to provide feedback signal $U_{FB}$ 117, which is representative of the output quantity $U_O$ 115. Feedback signal $U_{FB}$ 117 may be a voltage signal or a current signal. In one example, the sense circuit 114 may sense the output quantity $U_O$ 115 from an additional winding included in the energy transfer element of one of the power converter stages of the lighting driver 110. In a further example, the sense circuit 114 may utilize a voltage divider to sense the output quantity $U_O$ 115 from the output of the lighting driver 110.

Controller 116 is coupled to the sense circuit 114 and receives the feedback signal $U_{FB}$ 117. The controller 116 is further coupled to receive signals representative of the input voltage $V_{IN}$ 107 and the input current $I_{IN}$ 109. In addition, the controller 116 is coupled to receive the input sense signal 129. The input sense signal 129 may be representative of the input voltage $V_{IN}$ 107 or the voltage $V_1$ 119. Or in other words, the input sense signal 129 may be representative of an input of a power converter stage. The signals received by the controller 116 may be voltage signals or current signals. Controller 116 is coupled to provide various drive signals for each of the power converter stages of the lighting driver 110. As shown, the controller provides the first drive signal 131, which is received by the first converter stage 118, and the NTH drive signal 132, which is received by the NTH converter stage 120.

As illustrated in FIG. 1, the controller 116 includes the leading edge detection circuit 122, trailing edge detection circuit 124, shaping circuit 126 and the drive circuit 130. As illustrated, the leading edge detection circuit 122 and trailing edge detection circuit 124 are both coupled to receive the signals representative of the input voltage $V_{IN}$ 107 and the input current $I_{IN}$ 109. However, it should be appreciated that either the leading edge detection circuit 122 or the trailing edge detection circuit 124 may be coupled to receive only the signal representative of the input voltage $V_{IN}$ 107 or the signal representative of the input current $I_{IN}$ 109. The leading edge detection circuit 122 outputs the leading edge signal $U_{LE}$ 123, which is representative of a leading edge associated with a leading edge dimmer circuit. For instance, in various examples, the leading edge signal $U_{LE}$ 123 is representative of a detected or soon to be detected leading edge associated with a leading edge dimmer circuit. The trailing edge detection circuit 124 outputs the trailing edge signal $U_{TE}$ 125, which is representative of trailing edge associated with a trailing edge dimmer circuit. For instance, in various examples, the trailing edge signal $U_{TE}$ 125 may be representative of a detected or soon to be detected trailing edge associated with the trailing edge dimmer circuit.

The shaping circuit 126 is coupled to receive the leading edge signal $U_{LE}$ 123 and the trailing edge signal $U_{TE}$ 125 and outputs the first shaping signal $U_{S1}$ 127 and the second shaping signal $U_{S2}$ 128. The drive circuit 130 is coupled to output the first drive signal 131 and the NTH drive signal 132 in response to the feedback signal $U_{FB}$ 117, first shaping signal $U_{S1}$ 127, and the second shaping signal $U_{S2}$ 128. The controller 116 (and drive circuit 130) may also be coupled to receive signals representative of the switch current of the power switches for each of the power converter stages of the lighting driver 110 (not shown). In response to the first and second shaping signals, $U_{S1}$ 127 and $U_{S2}$ 128, the drive circuit 130 may vary the duty ratio, on-time, off-time, or switching frequency of either the first or second drive signal 131, 132, or both.

Figure 7A:
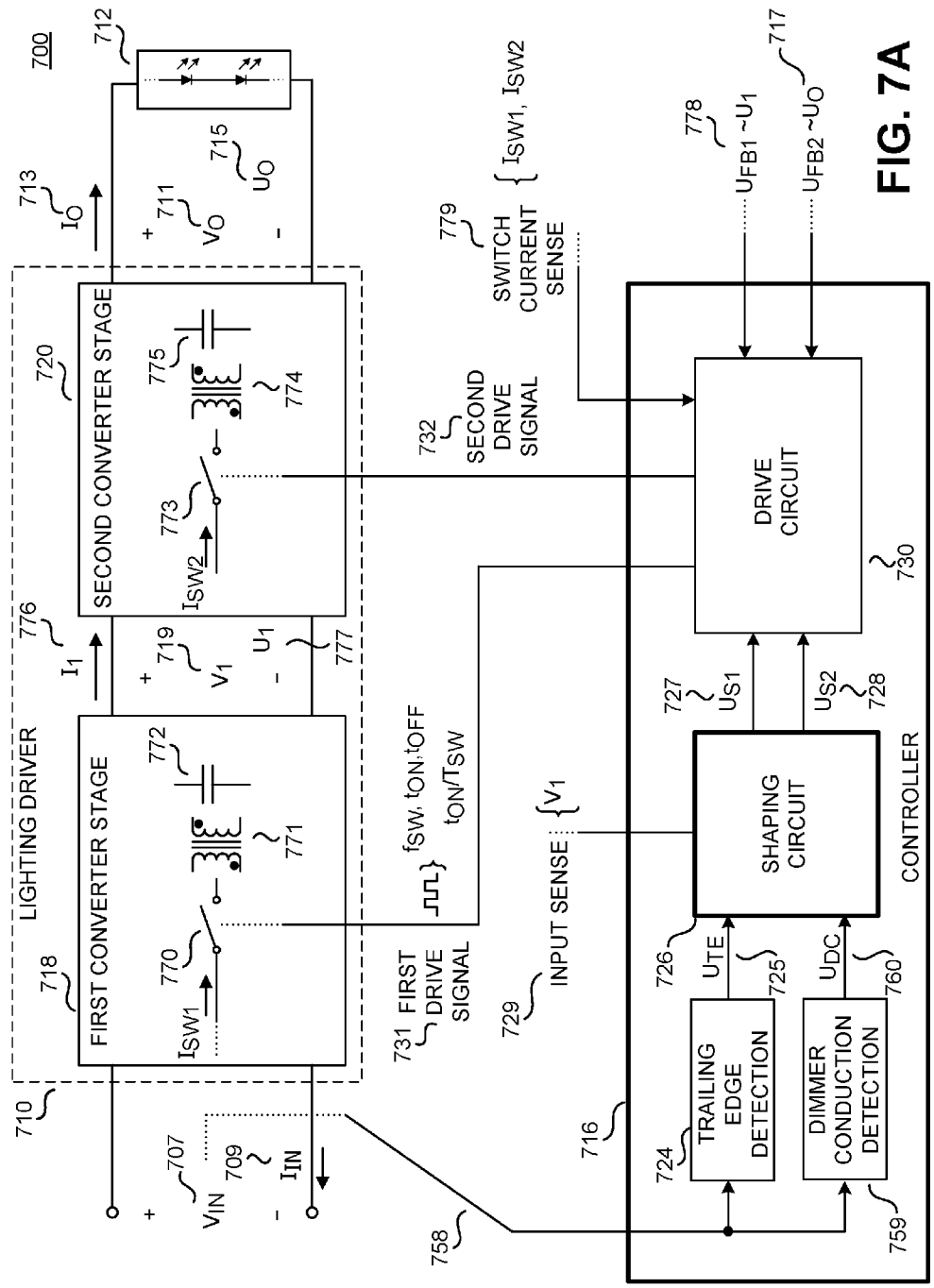
FIG. 7A is a functional block diagram illustrating an example lighting system utilizing a driver with two power converters and a controller in accordance with an example of the present invention.

As will be further discussed with respect to FIG. 7A, the controller 116 may optionally include a dimmer conduction detection circuit that may be coupled to receive the signal representative of the input voltage $V_{IN}$ 107, signal representative of the input current $I_{IN}$ 109. The dimmer conduction detection circuit may output the dimmer conduction signal, representative of when the dimmer circuit is conducting, to the shaping circuit.

In operation, the lighting driver 110 provides output power to the load 112 from an unregulated input (i.e., ac input voltage $V_{AC}$ 102). The dimmer circuit 104 may be utilized to limit the amount of voltage delivered to the lighting driver 110. For the example of an LED load, when the dimmer circuit 104 limits the amount of voltage delivered to lighting driver 110, the resultant current delivered to the load of LED arrays is also limited, and the LED array dims. For leading edge dimming, the dimmer circuit 104 disconnects the ac input voltage $V_{AC}$ 102 when the ac input current 109 crosses zero. After a given amount of time, the dimmer circuit 104 reconnects the ac input voltage $V_{AC}$ 102 with the lighting driver 110 and/or power converter 100. The amount of time before the dimmer circuit reconnects the ac input voltage $V_{AC}$ 102 is set by a user. For trailing edge dimming, the dimmer circuit 104 connects the input to the power converter when the ac input voltage $V_{AC}$ 102 crosses zero voltage. After a given amount of time set by a user, the dimmer circuit 104 then disconnects the ac input voltage $V_{AC}$ 102 for the remainder of the half cycle. Depending on the amount of dimming wanted, the dimmer circuit 104 controls the amount of time the ac input voltage $V_{AC}$ 102 is disconnected from the power converter. In general, the more dimming desired corresponds to a longer period of time during which the dimming circuit 104 disconnects the ac input voltage $V_{AC}$ 102.

The dimmer circuit 104 produces the dimmer output voltage $V_{DO}$ 106 that is received and rectified by rectifier 108. The result is the input voltage $V_{IN}$ 107. The power converter stages may include dc-dc converters. The lighting driver 110 uses one or more power converter stages to control the transfer of energy from its input to its output. In some examples, the power converter stages may include a power switch that switches to control the transfer of energy through an energy transfer element.

The sense circuit 114 senses the output quantity $U_O$ 115 of the lighting driver 110 to provide the feedback signal $U_{FB}$ 117 to the controller 116. The feedback signal $U_{FB}$ 117 provides information regarding the output quantity $U_O$ 115 to the controller 116. The drive circuit 130 controls various switching parameters (such as the switch on-time, switch off-time, duty ratio, switching frequency, or the number of pulses per unit time) of the power switches of the power converter stages (such as first power converter 118 and NTH power converter 120 through the first drive signal 131 and NTH drive signal 132, respectively) of the lighting driver 110 in response to the feedback signal $U_{FB}$ 117. Although not shown, the drive circuit 130 may also respond to the sensed power switch currents of the power converter stages of the lighting driver 110.

The leading edge detection circuit 122 determines if a leading edge (due to a leading edge dimmer circuit) has been detected or will soon be detected from the input voltage $V_{IN}$ 107, input current $I_{IN}$ 109, or both, and outputs the leading edge signal $U_{LE}$ 123. As mentioned above, the detection of a leading edge may correspond to when a leading edge dimmer circuit 104 begins conducting. In one example, the leading edge signal $U_{LE}$ 123 may be a rectangular pulse waveform that pulses to a logic high value when a leading edge is detected or will soon be detected. The trailing edge detection circuit 124 determines if a trailing edge (due to a trailing edge dimmer circuit) has been detected or will soon be detected from the input voltage $V_{IN}$ 107, input current $I_{IN}$ 109, or both, outputs the trailing edge signal $U_{TE}$ 125. Detection of the trailing edge may correspond to when a trailing edge dimmer circuit 104 has stopped conducting. In one example, the trailing edge signal $U_{TE}$ 125 may be a rectangular pulse waveform that pulses to a logic high value when a trailing edge is detected or will soon be detected.

The shaping circuit 126 may output the first and second shaping signals $U_{S1}$ 127 and $U_{S2}$ 128 in response to the leading edge signal $U_{LE}$ 123, trailing edge signal $U_{TE}$ 125, and the input sense signal 129 (representative of the input of a power converter stage such as the input voltage $V_{IN}$ 107 or voltage $V_1$ 119). The shaping circuit 126 determines when to reshape the input current $I_{IN}$ 109 of the lighting system 100 and sends the reshaping parameters to the drive circuit 130 via the first and second shaping signals $U_{S1}$ 127 and $U_{S2}$ 128. The first and second shaping signals $U_{S1}$ 127 and $U_{S2}$ 128 may be voltage signals or current signals. The input current $I_{IN}$ 109 of the lighting system 100 may be reshaped by varying one or more switching parameters of the power switches of the power converters stages. As such, the drive circuit 130 responds to the outputted first and second shaping signals $U_{S1}$ 127 and $U_{S2}$ 128, and may vary the switching parameters of the first drive signal 131, the NTH drive signal 132, or both. Further, the input current $I_{IN}$ 109 of the lighting system 100 may be increased by increasing the current through the power switch of one or more of the power converter stages of the lighting driver 110. In one example, the drive circuit 130 may increase one or more switching parameters of the first drive signal 131, NTH drive signal 132, or both. For example, the drive circuit 130 may increase the switching frequency, duty ratio, or on-time to increase the current through the power switch of one or more of the power converter stages of the lighting driver 110. Alternatively, the drive circuit 130 may decrease the off-time to increase the current through the power switch.

Figure 2A:
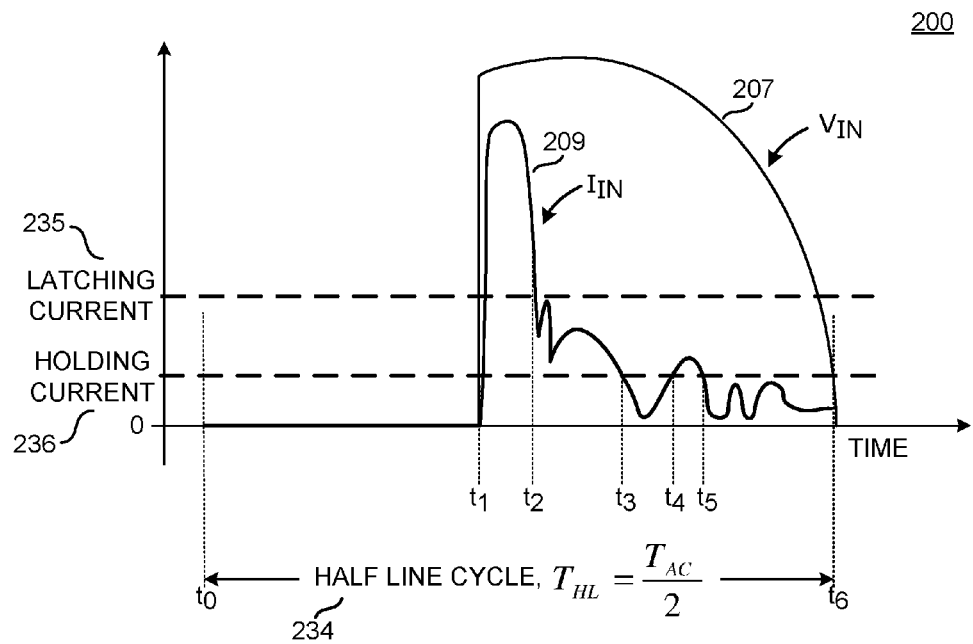
FIG. 2A is a diagram illustrating example waveforms of an input voltage and an input current of FIG. 1 in accordance with an example of the present invention.
Figure 2B:
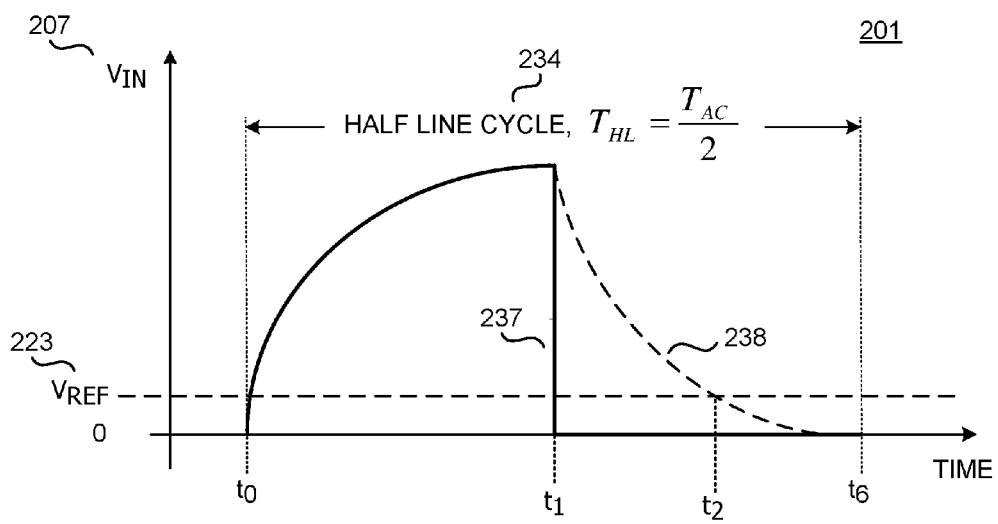
FIG. 2B is another diagram illustrating an example waveform of an input voltage.

FIG. 2A and FIG. 2B illustrate the various issues that may occur with leading or trailing edge dimming. Referring to FIG. 2A, an example input voltage $V_{IN}$ 207 waveform and input current $I_{IN}$ 209 waveform are illustrated. In particular, FIG. 2A shows an example input voltage $V_{IN}$ 207 waveform and input current $I_{IN}$ 209 for one half line cycle $T_{AC}/2$ 234 as output by a leading edge dimmer circuit without reshaping the input current.

The input voltage $V_{IN}$ 207 is substantially zero at the beginning of the half line cycle $T_{AC}/2$ 234. When the dimmer circuit reconnects the ac line voltage $V_{AC}$, the input voltage $V_{IN}$ 207 increases quickly and substantially follows the voltage of ac line voltage $V_{AC}$ for the remainder of the half line cycle $T_{AC}/2$ 234. At the beginning of the half line cycle 234, the input current $I_{IN}$ 209 is also substantially zero until the dimmer circuit fires. Once the dimmer circuit fires, the input current $I_{IN}$ 209 also increases quickly. As shown in FIG. 2A, without reshaping the input current, the input current $I_{IN}$ 209 may ring. This is partially due to an input capacitor included with the lighting driver and other inductive and capacitive elements included within the lighting driver. As illustrated in FIG. 2A, the input current $I_{IN}$ 209 may increase and decrease several times during the half line cycle $T_{AC}/2$ 234 as a consequence of the ringing. If the input current $I_{IN}$ 209 falls below the holding current 236 of the dimmer circuit before the end of the half line cycle $T_{AC}/2$ 234 (shown between times $t_3$ and $t_4$, and after time $t_5$), or before the input signal $V_{IN}$ 207 has reached zero, the dimmer circuit may prematurely turn off and cause flickering in the load driven by the lighting driver. The latching current 235 is also illustrated. The dimmer circuit latches and remains on when the input current $I_{IN}$ 209 is above the latching current 235. Without reshaping the input current, the lighting driver may not have sufficient current to exceed the latching current, in particular at low conduction angles.

Referring next to FIG. 2B, an example waveform of the input voltage $V_{IN}$ 207 is shown including a first reference $V_{REF}$ 223, and edges 237 and 238. FIG. 2B illustrates one half line cycle $T_{HL}$ 234 of the input voltage $V_{IN}$ 207 for a trailing edge dimmer circuit when the dimmer circuit is disconnecting a portion of the ac input voltage $V_{AC}$ from the lighting driver.

Input voltage $V_{IN}$ 207 substantially follows the sinusoidal shape of the ac input voltage at the beginning of the half line cycle $T_{HL}$ 234. At time $t_1$, the dimmer circuit disconnects the ac input voltage $V_{AC}$ from the lighting driver and the input voltage $V_{IN}$ 207 falls to substantially zero. Threshold detection may be utilized to determine when the dimmer circuit is or is not conducting by comparing the input voltage $V_{IN}$ 207 to first reference $V_{REF}$ 223. The amount of time that the input voltage $V_{IN}$ 207 is above the first reference $V_{REF}$ 223 may correspond to the dimmer circuit conducting (and vice versa). Edge 237 illustrates a close to ideal response of the input voltage $V_{IN}$ 207. As illustrated, edge 237 falls quickly to zero at time $t_1$ and the input voltage $V_{IN}$ 207 is less than the first reference $V_{REF}$ 223 at time $t_1$. However, without reshaping the input current, the input voltage $V_{IN}$ 207 does not fall to zero as quickly as illustrated by edge 237. Rather, the input voltage $V_{IN}$ 207 may fall to zero as shown by edge 238 due to leakage current of the dimmer circuit, and input voltage $V_{IN}$ 207 consequently does not reach the first reference $V_{REF}$ 223 until time $t_2$, which is after the dimmer circuit has stopped conducting at time $t_1$. As such, measurement of the conduction angle of the dimmer circuit may be inaccurate.

Figure 3A:
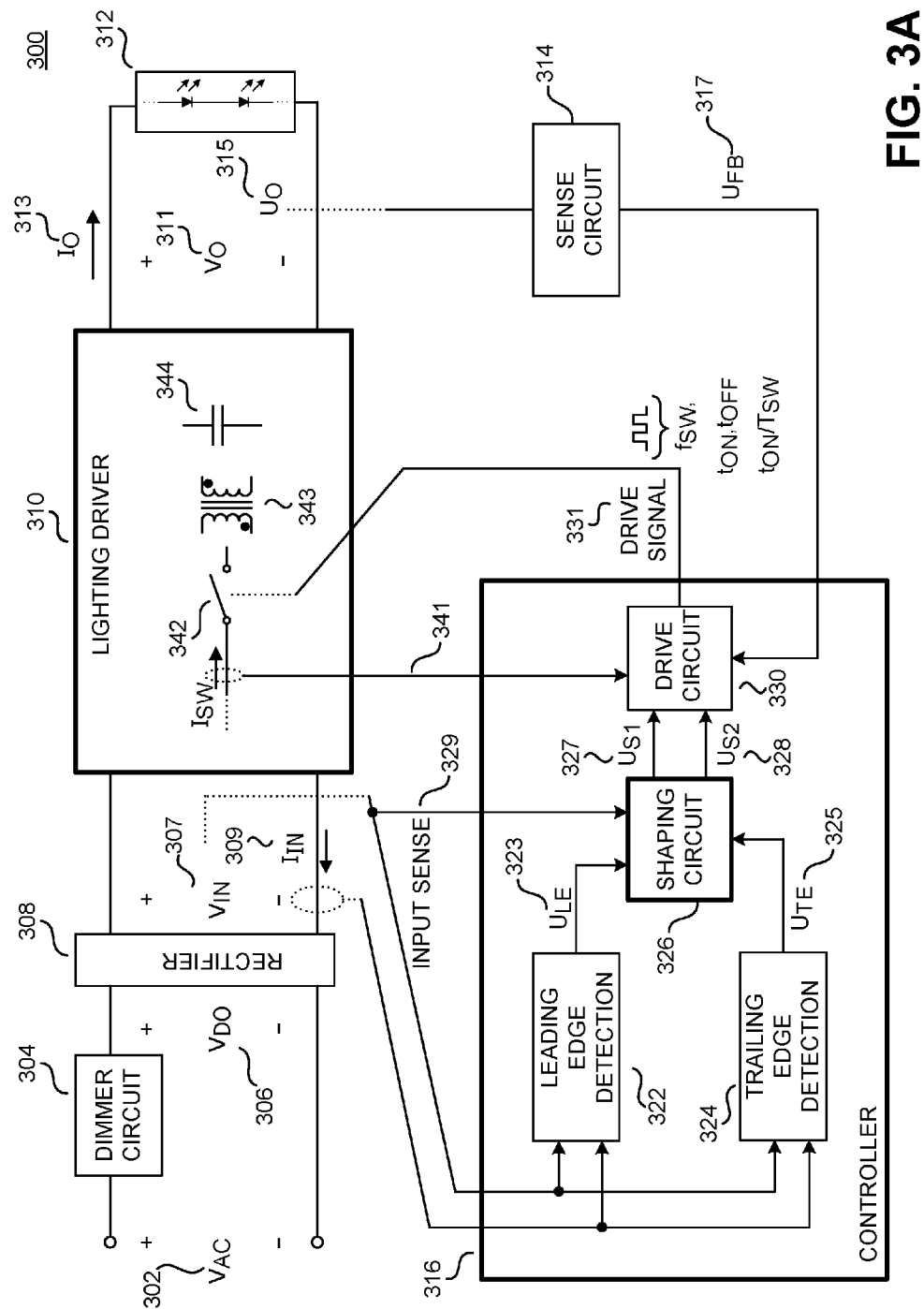
FIG. 3A is a functional block diagram illustrating an example lighting system utilizing a driver with a single power converter and a controller in accordance with an example of the present invention.

FIG. 3A is a functional block diagram illustrating an example lighting system 300 utilizing a lighting driver 310 with a single power converter stage. The lighting system 300 is shown including the ac input voltage $V_{AC}$ 302, dimmer circuit 304, rectifier 308, lighting driver 310 (such as an LED driver), load 312, sense circuit 314, and controller 316. As shown, the lighting driver 310 includes a power converter such as a dc-dc converter that includes a power switch 342, energy transfer element 343, and an output capacitance 344. The controller 316 is shown as including leading edge detection circuit 322, trailing edge detection circuit 324, shaping circuit 326, and drive circuit 330. Further shown in FIG. 3A is dimmer output voltage $V_{DO}$ 306, input voltage $V_{IN}$ 307, input current $I_{IN}$ 309, output voltage $V_O$ 311, output current $I_O$ 313, output quantity $U_O$ 315, feedback signal $U_{FB}$ 317, leading edge signal $U_{LE}$ 323, trailing edge signal $U_{TE}$ 325, first shape signal $U_{S1}$ 327, second shape signal $U_{S2}$ 328, input sense signal 329, drive signal 331, and a switch current sense 341. It should be appreciated that any converter topology, isolated or non-isolated, may be used for the power converter of lighting driver 310.

Figure 3B:
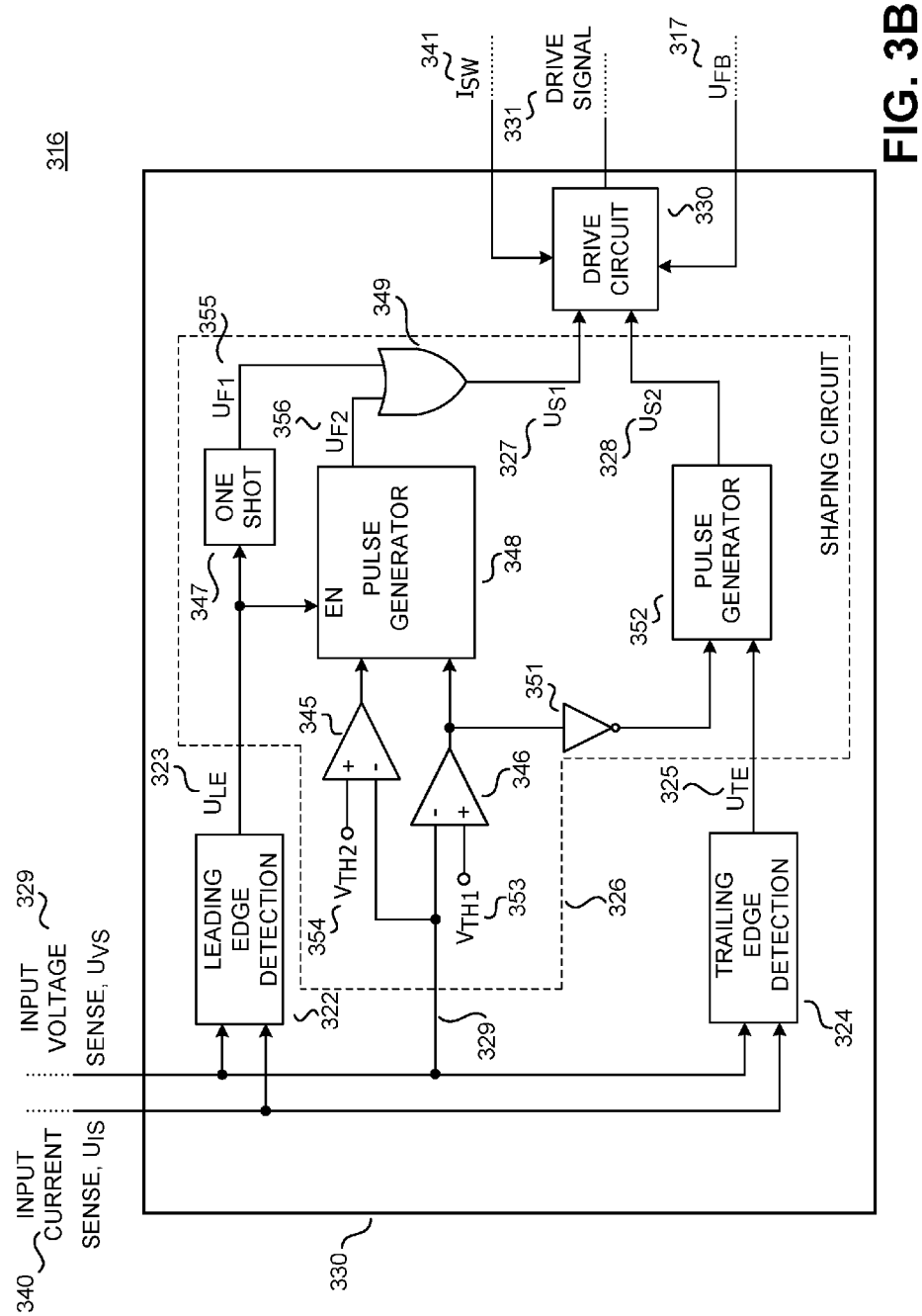
FIG. 3B is a functional block diagram of a shaping circuit of the controller of FIG. 3A in accordance with an example of the present invention.

Similarly named and numbered elements in FIG. 3A are coupled and function as described above with respect to FIG. 1. Further, FIG. 3A and FIG. 3B illustrate reshaping the input current $I_{IN}$ 309 utilizing a single power converter as the lighting driver 310 and controller 316. In the illustrated example, the lighting driver 310 includes a dc-dc power converter for providing a regulated output voltage $V_O$ 311, output current $I_O$ 313, or both to the load 312. In some examples, the dc-dc power converter includes the power switch 342, such as a metal oxide semiconductor field effect transistor (MOSFET), which switches to control the transfer of energy through energy transfer element 343. Specifically, switch 342 may be used to control the amount of current $I_{SW}$ in the primary winding of energy transfer element 343, and thus, the amount of power transferred to the output winding of energy transfer element 343, by switching between an ON state (allowing the switch to conduct current) and an OFF state (preventing the switch from conducting current). Further, the switch current $I_{SW}$ may be controlled to reshape the input current $I_{IN}$ 309. Lighting driver 310 further includes an output capacitor 344 for filtering the output voltage $V_O$ 311.

Further illustrated in FIG. 3A is the switch current sense signal 341, which is representative of the switch current $I_{SW}$ through the power switch 342. As shown, the drive circuit 330 of the controller 316 is coupled to receive the switch current sense signal 341. The drive circuit 330 is coupled to output the drive signal 331 to control the switching of the power switch 342. In response to the feedback signal $U_{FB}$ 317, switch current sense signal 341, and first and second shape signals $U_{S1}$ 327 and $U_{S2}$ 328, the drive circuit 330 may vary one or more switching parameters of the drive signal 331. These switching parameters may include the switching frequency, duty ratio, on-time, off-time, and the number of pulses per unit time.

When the lighting driver 310 is a single power converter, the shaping circuit 326 receives the input sense signal 329 that is representative of the input voltage $V_{IN}$ 307 of the lighting driver 310. The shaping circuit may output the first shape signal $U_{S1}$ 327 in response to the leading edge signal $U_{LE}$ 323 and the input sense signal 329. Further, the shaping circuit may output the second shape signal $U_{S2}$ 328 in response to the trailing edge signal $U_{TE}$ 325 and the input sense signal 329. As mentioned above, leading edge signal $U_{LE}$ 323 and the trailing edge signal $U_{TE}$ 325 are representative of a leading edge or trailing edge in the input voltage $V_{IN}$ 307. For instance, in various examples, leading edge signal $U_{LE}$ 323 and the trailing edge signal $U_{TE}$ 325 are rectangular pulse waveforms that pulse to a logic high value when a leading edge or trailing edge has been detected or will soon be detected, respectively. Further, the first and second shape signals $U_{S1}$ 327 and $U_{S2}$ 328 may be rectangular pulse waveforms with varying lengths of logic high and logic low sections In various examples, the controller 316 reshapes the input current $I_{IN}$ 309 by varying the switch current $I_{SW}$ in response to leading edge signal $U_{LE}$ 323, the trailing edge signal $U_{TE}$ 325, or input sense signal 329 when either a leading edge or a trailing edge has been detected or will soon be detected. In one example, the controller 316 increases the input current $I_{IN}$ 309 by increasing the switch current $I_{SW}$ when either a leading edge or a trailing edge has been detected or will soon be detected. The switch current $I_{SW}$ may be increased by increasing one or more parameters (such as switching frequency, on-time, or duty ratio) of the power switch 342. In one example, a logic high value from either the first shape signal $U_{S1}$ 327 or the second shape signal $U_{S2}$ 328 may correspond to the increasing the switch current $I_{SW}$ and the drive circuit 330 may vary the drive signal 331 accordingly.

In operation, the shaping circuit 326 asserts the first shape signal $U_{S1}$ 327 (i.e., outputs a logic high value) for a fixed amount of time (T1) after the leading edge signal $U_{LE}$ 323 has been asserted (i.e., received a pulse). Further, the shaping circuit 326 asserts the first shape signal $U_{S1}$ 327 when the input sense signal 329 indicates that the input voltage $V_{IN}$ 307 has fallen below the first threshold $V_{TH1}$ and until the input voltage $V_{IN}$ 307 has risen above the second threshold $V_{TH2}$. The shaping circuit 326 may also assert the first shape signal $U_{S1}$ 327 when the input sense signal 329 indicates that the input voltage $V_{IN}$ 307 is between a first and second threshold $V_{TH1}$ and $V_{TH2}$. When the first shape signal $U_{S1}$ 327 is asserted, the drive circuit 330 increases the switch current $I_{SW}$ by increasing the duty ratio, switching frequency, or both of the drive signal 331. By increasing the switch current $I_{SW}$ (and as such increasing the input current $I_{IN}$ 309) near the detected leading edge, the controller 316 may ensure that the latching threshold is met.

For trailing edge operation, the shaping circuit 326 asserts the second shape signal $U_{S2}$ 328 (i.e., outputs a logic high value) when the trailing edge signal $U_{TE}$ 325 has been asserted (i.e., received a pulse) and the input sense signal 329 indicates that the input voltage $V_{IN}$ 307 is greater than the first threshold $V_{TH1}$. When the second shape signal $U_{S2}$ 328 is asserted, the drive circuit 330 increases the switch current $I_{SW}$ by increasing the duty ratio, switching frequency, or both of the drive signal 331. The second shape signal $U_{S2}$ 328 is asserted until the input voltage $V_{IN}$ 307 drops below the first threshold $V_{TH1}$. By increasing the switch current $I_{SW}$ (and as such increasing the input current $I_{IN}$ 309) near the detected trailing edge, the controller 316 may facilitate the discharging the lighting driver 310 input capacitors to increase the accuracy of conduction angle detection.

FIG. 3B is a function block diagram illustrating the controller 316 and example shaping circuit 326. The controller 316 is shown including leading edge detection circuit 322, trailing edge detection circuit 324, shaping circuit 326, and the drive circuit 330. The shaping circuit 326 is further shown as including comparators 345 and 346, a monostable multivibrator 347 (also referred to as a one shot 347), a pulse generator 348, an OR gate 349, an inverter 351, and a pulse generator 352. Further illustrated in FIG. 3B are the input current sense signal $U_{IS}$ 340, input voltage sense signal $U_{VS}$ 329 (which is also the input sense signal 329 received by the shaping circuit), leading edge signal $U_{LE}$ 323, trailing edge signal $U_{TE}$ 325, switch current sense $I_{SW}$ 341, feedback signal $U_{FB}$ 317, first shape signal $U_{S1}$ 327, second shape signal $U_{S2}$ 328, signal $U_{F1}$ 355, and signal $U_{F2}$ 356.

Similarly named and numbered elements are coupled and function as described above with respect to FIG. 1 and FIG. 3A. Further, FIG. 3B illustrates one example of the shaping circuit 326 for reshaping the input current utilizing a single power converter as the lighting driver 310. Comparators 345 and 346 are coupled to receive the input sense signal 329, which is representative of the input voltage $V_{IN}$ of the lighting driver 310. As shown, comparators 345 and 346 receive the input sense signal 329 ($V_{IN}$) at the inverting input. Comparator 345 is coupled to receive the second threshold $V_{TH2}$ 354 at its non-inverting input, while comparator 346 receives the first threshold $V_{TH1}$ 353 at its non-inverting input. Outputs of comparators 345 and 346 are received by the pulse generator 348. The shaping circuit 326 is coupled to receive the leading edge signal $U_{LE}$ 323 at the one shot 347 and the enable input of the pulse generator 348. The output of the one shot 347 is shown as signal $U_{F1}$ 355, which is received by the OR gate 349. Pulse generator 348 outputs the signal $U_{F2}$ 356, which is also received by the OR gate 349. Signals $U_{F1}$ 355 and $U_{F2}$ 356 may be rectangular pulse waveforms of varying lengths of logic high or logic low values and may be a voltage or current signal. As shown, the output of the OR gate 349 is the first shaping signal $U_{S1}$ 327.

In operation, when the leading edge signal $U_{LE}$ 323 indicates that a leading edge has been detected, the one shot 347 outputs the signal $U_{F1}$ 355 with a pulse of length T1. In addition, once the leading edge has been detected, the pulse generator 348 is enabled. In one example, the pulse generator 348 may be enabled for several switching cycles after a leading edge has been initially detected. Once enabled, the output ($U_{F2}$ 356) of the pulse generator 348 transitions to a logic high value when the input voltage $V_{IN}$ provided by the sense input 329 is less than the first threshold $V_{TH1}$ 353. Or in other words, the signal $U_{F2}$ 356 transitions to a logic high value at the leading edge of the output of comparator 346. The signal $U_{F2}$ 356 remains logic high until the input voltage $V_{IN}$ provided by the sense input 329 reaches the second threshold $V_{TH2}$ 346. The output ($U_{F2}$ 356) of the pulse generator 348 transitions to a logic low when the input voltage $V_{IN}$ provided by the sense input 329 is greater than the second threshold $V_{TH2}$ 346. Or in other words, the signal $U_{F2}$ 356 transitions to a logic low value at the falling edge of comparator 345. As such, the signal $U_{F2}$ 356 is logic high when the input voltage $V_{IN}$ is greater than the first threshold $V_{TH1}$ 353 and less than the second threshold $V_{TH2}$ 346. When either the signal $U_{F1}$ 355 or the signal $U_{F2}$ 356 is logic high, the OR gate 349 outputs a logic high for the shaping signal $U_{S1}$ 327, indicating to the drive circuit 330 to increase current through the power switch by varying the duty ratio or switching frequency of the drive signal 331. As such, the drive circuit 330 increases current through the power switch for at least T1 amount of time after a leading edge is detected and when the input voltage $V_{IN}$ is greater than the first threshold $V_{TH1}$ 353 and less than the second threshold $V_{TH2}$ 346 once a leading edge is detected. By increasing the current through the power switch, the input current of the power converter may be reshaped.

Further, the output of comparator 346 is coupled to the inverter 351. The output of the inverter 351 is coupled to the pulse generator 352. The pulse generator 352 is coupled to receive the trailing edge signal $U_{TE}$ 325 from the trailing edge detection circuit 324, and the output of the pulse generator 328 is the second shaping signal $U_{S2}$ 328.

In operation, the pulse generator 352 receives the inverted output of comparator 346. The output of the inverter 351 is logic high when the input voltage $V_{IN}$ is greater than the first threshold $V_{TH1}$ 353. The output of the pulse generator 352 (second shape signal $U_{S2}$ 328) transitions to a logic high value when the trailing edge has been detected (i.e., when trailing edge signal $U_{TE}$ 325 transitions to a logic high value). Once the input voltage $V_{IN}$ falls below the first threshold $V_{TH1}$ 353, the output of inverter 351 transitions to a logic low value. When the input voltage $V_{IN}$ eventually rises above the first threshold $V_{TH1}$ 353, the output of the pulse generator 352 (second shape signal $U_{S2}$ 328) transitions to the logic low value. Or in other words, the pulse generator 352 outputs a logic high value at the leading edge of the trailing edge signal $U_{TE}$ 325 and outputs a logic low value at the next leading edge of the output of inverter 351. The logic high value of the second shape signal $U_{S2}$ 328 indicates to the drive circuit 330 to increase current through the power switch by varying the duty ratio or switching frequency of the drive signal 331. By increasing the current through the power switch, the input current of the power converter may be reshaped.

FIG. 4A and FIG. 4B illustrate timing diagrams 400 and 401 for various signals of the controller shown in FIG. 3B. In particular, FIG. 4A illustrates example waveforms for when a leading edge dimmer circuit is utilized, while FIG. 4B illustrates example waveforms for when a trailing edge dimmer circuit is utilized. FIG. 4A illustrates example waveforms for the input voltage $V_{IN}$ 407, the output 446 of comparator 346 ($V_{IN}$ is less than the first threshold $V_{TH1}$ 453), the output 445 of comparator 345 ($V_{IN}$ is less than the second threshold $V_{TH2}$ 454), signal $U_{F2}$ 456, leading edge signal $U_{LE}$ 423, signal $U_{F1}$ 455, first shape signal $U_{S1}$ 427, and input current $I_{IN}$ 409. Further shown are the first threshold $V_{TH1}$ 453 and the second threshold $V_{TH2}$ 454. As illustrated, the value of the second threshold $V_{TH2}$ 454 is greater than the first threshold $V_{TH1}$ 453. In addition, similarly named and numbered elements are coupled and function as described above.

FIG. 4A illustrates one full line cycle $T_{AC}$ 433, or two half line cycles $T_{HL}$ 434 of the input voltage $V_{IN}$ 407 when a leading edge dimmer circuit is used. At the beginning of the full line cycle $T_{AC}$ 433, the input voltage $V_{IN}$ 407 is substantially zero due to the leading edge dimmer circuit not conducting. During this time, the input voltage $V_{IN}$ 407 is less than the both the first threshold $V_{TH1}$ 453 and second threshold $V_{TH2}$ 454 and as such, both the outputs 446 and 445 of comparators 346 and 345, respectively, are logic high. Once the leading edge dimmer circuit begins conducting, a pulse may be observed in the leading edge signal $U_{LE}$ 423 indicating that a leading edge has been detected. Further, the input voltage $V_{IN}$ 407 begins to increase. Once the input voltage $V_{IN}$ 407 reaches the first threshold $V_{TH1}$ 453, the output 446 transitions to a logic low value. Similarly, when the input voltage $V_{IN}$ 407 reaches the second threshold $V_{TH2}$ 454, the output 445 transitions to a logic low value. Once a pulse is observed in the leading edge signal $U_{LE}$ 423, the signal $U_{F1}$ 455 transitions to a logic high value for T1 duration of time. During this first half line cycle $T_{HL}$ 434, the signal $U_{F2}$ 456 is logic low for the first half line cycle $T_{HL}$ 434 since the pulse generator 348 is not enabled. However the pulse in the leading edge signal $U_{LE}$ 423 enables the pulse generator 348 for the next half line cycle $T_{HL}$ 434. The first shape signal $U_{S1}$ 427 is logic high when the signal $U_{F1}$ 455 is logic high. As illustrated in FIG. 4A, an increase can be seen in the input current $I_{IN}$ 409.

The outputs 446 and 445 transition to a logic high value when the input voltage $V_{IN}$ 407 fall below the first threshold $V_{TH1}$ 453 and the second threshold $V_{TH2}$ 454, respectively. At the beginning of the second half line cycle $T_{HL}$ 434, both the outputs 446 and 445 are logic high. Unlike the first half line cycle $T_{HL}$ 434, the pulse generator 348 is enabled. As such, the signal $U_{F2}$ 456 transitions to a logic high value at the leading edge of the output 446 (when input voltage $V_{IN}$ 407 is less than the first threshold $V_{TH1}$ 453). The signal $U_{F2}$ 456 transitions to a logic low value at the trailing edge of output 445 (when the input voltage $V_{IN}$ 407 is greater than the second threshold $V_{TH2}$ 454). The signal $U_{F1}$ 455 is logic high for T1 length of time after the pulse in the leading edge signal $U_{LE}$ 423. The first shape signal $U_{S1}$ 427 is logic high when either the signals $U_{F1}$ 455 or $U_{F2}$ 456 are logic high. As shown in FIG. 4A, the first shape signal $U_{S1}$ 427 transitions to a logic high value earlier in the second half line cycle $T_{HL}$ 434 as compared to the previous half line cycle $T_{HL}$ 434. This is partially due to the leading edge being detected after the dimmer circuit begins conducting and the input voltage $V_{IN}$ 407 increases. By allowing the first shape signal $U_{S1}$ 427 to transition to a logic high value sooner, the input current $I_{IN}$ 409 may be increased sooner, which may help to ensure sufficient latching current for the dimmer circuit.

FIG. 4B illustrates one full line cycle $T_{AC}$ 433, or two half line cycles $T_{HL}$ 434 of the input voltage $V_{IN}$ 407 when a trailing edge dimmer circuit is used. As shown, FIG. 4B illustrates waveforms for the input voltage $V_{IN}$ 407, trailing edge signal $U_{TE}$ 425, the output 451 of inverter 351, second shape signal $U_{S2}$ 428, and the input current $I_{IN}$ 409. Similarly named and numbered elements are coupled and function as described above. At the beginning of both the half line cycles $T_{HL}$ 434, the input voltage $V_{IN}$ 407 is substantially following the ac input voltage $V_{AC}$. The output 451 is logic high since the input voltage $V_{IN}$ 407 is greater than the first threshold $V_{TH1}$ 453. When a trailing edge is detected, a pulse is seen in the trailing edge signal $U_{TE}$ 425 and the input voltage $V_{IN}$ 407 begins to decrease. At that time, the input voltage $V_{IN}$ 407 is still greater than the first threshold $V_{TH1}$ 453. The second shape signal $U_{S2}$ 428 is logic high once the trailing edge signal $U_{TE}$ 425 pulses to a logic high value. The second shape signal $U_{S2}$ 428 remains logic high until the next leading edge of the output 451. When the second shape signal $U_{S2}$ 428 is logic high, the input current $I_{IN}$ 409 is increased. In one example, this helps discharge the input bulk capacitance of the lighting driver and facilitates the decrease of the input voltage $V_{IN}$ 407.

Figure 5A:
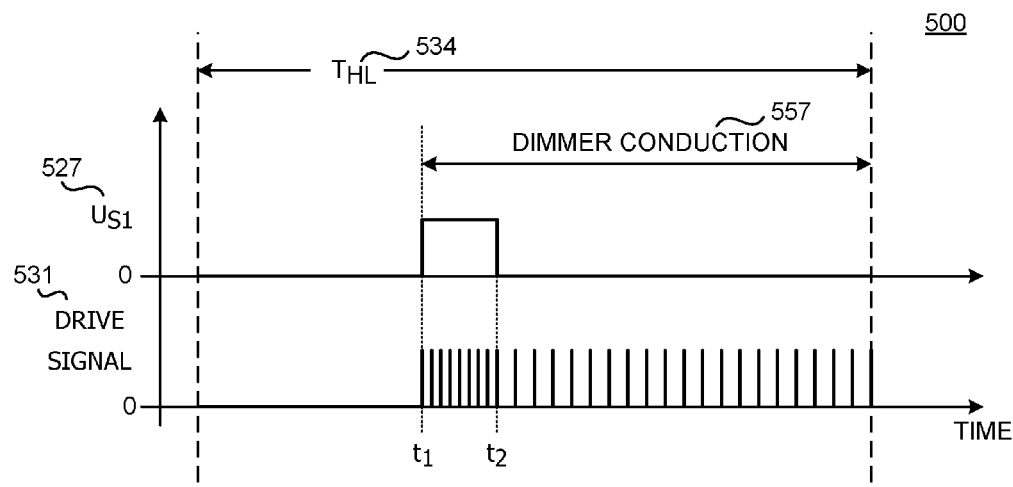
FIG. 5A is a timing diagram illustrating various signals of the controller of FIG. 3B when a leading edge dimmer circuit is utilized in accordance with an example of the present invention.
Figure 5B:
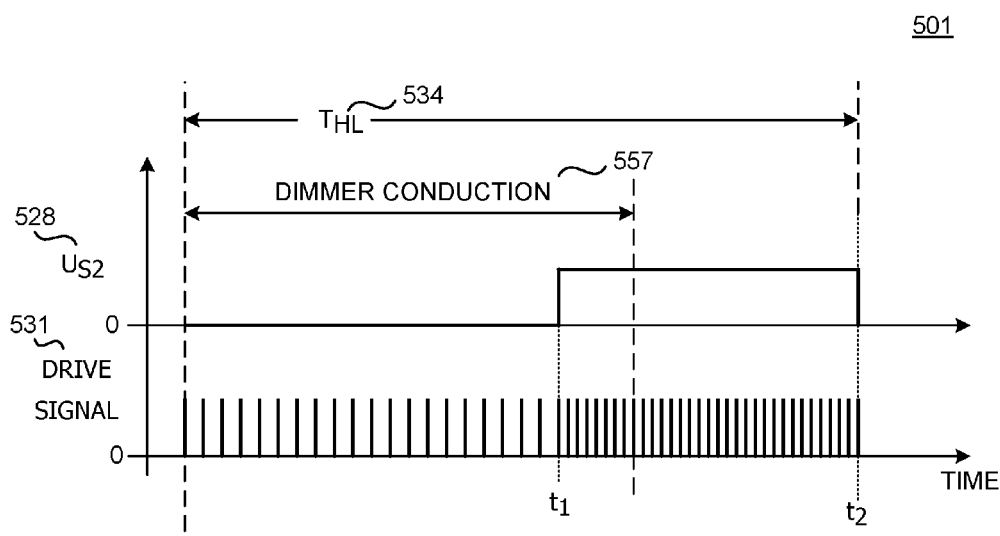
FIG. 5B is timing diagram illustrating various signals of the controller of FIG. 3B when a trailing edge dimmer circuit is utilized in accordance with an example of the present invention.

FIG. 5A and FIG. 5B illustrate the drive signal 531 of the controller of FIG. 3B for a leading edge and trailing edge dimmer circuit, respectively. Similarly named and numbered elements are coupled and function as described above. As shown in FIG. 5A, the dimmer circuit conduction 557 occurs in the later portion of the half line cycle $T_{HL}$ 534 for a leading edge dimmer circuit. Between times $t_1$ and $t_2$, the first shape signal $U_{S1}$ 527 is logic high. As such, between times $t_1$ and $t_2$, the switching frequency or the duty ratio of the drive signal 531 may be increased in a first higher current mode to increase current through the power switch and the input current. As shown in FIG. 5A by the density of the pulses of the drive signal 531, the switching frequency of the drive signal 531 is increased. The power switch is still switched on and off for the remainder of the dimmer conduction 557 as shown by the pulses in the drive signal 531.

As shown in FIG. 5B, the dimmer conduction 557 occurs at the beginning of the half line cycle $T_{HL}$ 534 for trailing edge dimmer circuits. Between times $t_1$ and $t_2$, the second shape signal $U_{S2}$ 528 is logic high. As such, between times $t_1$ and $t_2$, the switching frequency or the duty ratio of the drive signal 531 may be increased in a second higher current mode to increase current through the power switch and the input current. As shown in FIG. 5B by the density of the pulses of the drive signal 531, the switching frequency of the drive signal 531 is increased. Prior to time $t_1$, the power switch is still switched on and off for the entire dimmer conduction 557 as shown by the pulses in the drive signal 531. In one example, a first increased switching frequency in the first higher current mode is greater than a second increased switching frequency in the second higher current mode.

Figure 6:
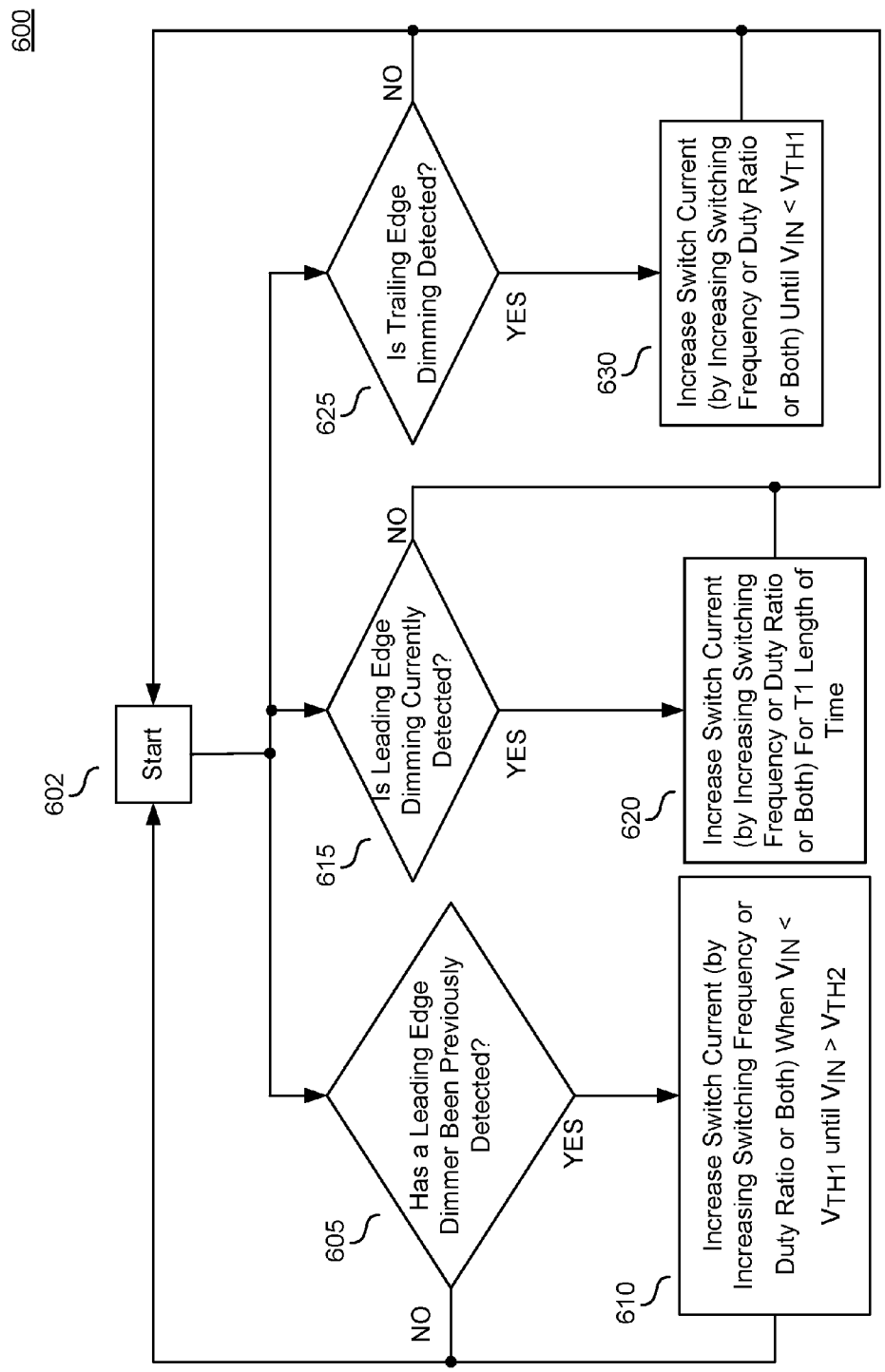
FIG. 6 is a flow diagram illustrating an example method for determining when to increase the switch current in accordance with an example of the present invention.

FIG. 6 is a flow diagram 600 illustrating an example method for determining when to increase the switch current of the power switch. The process starts at block 602 and may proceed to blocks 605, 615, or 625. At block 605, the process determines if a leading edge has been previously detected. If no, the process returns to the start 602. If yes, the process continues to block 610 and the switch current is increased by increasing switching frequency, duty ratio or both when the input voltage $V_{IN}$ is below the first threshold $V_{TH1}$ and until the input voltage $V_{IN}$ is above the second threshold $V_{TH2}$. Once complete, the process returns to block 602.

At block 615, the process determines if a leading edge is currently detected. If no, the process returns to the start 602. If yes, the process continues to block 620 and the switch current is increased by increasing switching frequency, duty ratio or both for T1 duration of time. Once complete the process returns to start 602.

At block 625, the process determines if a trailing edge is detected. If no, the process returns to the start 610. If yes, the process continues to block 630 and the switch current is increased by increasing switching frequency, duty ratio or both until the input voltage $V_{IN}$ is less than the first threshold $V_{TH1}$. Once complete the process returns to start 602.

FIG. 7A is a functional block diagram illustrating an example lighting system 700 utilizing a lighting driver 710 with a dual power converter stage. The lighting system 700 is shown including the lighting driver 710 (such as an LED driver), load 712, and controller 716. For clarity, the ac input voltage $V_{AC}$, dimmer circuit, rectifier, and sense circuits are not shown. In the depicted example, the lighting driver 710 includes a first power converter stage 718 and a second power converter stage 720. Each power converter stage 718 and 720 may include a dc-dc converter that includes a power switch 770 and 773, an energy transfer element 771 and 774, and an output capacitance 772 and 775. The controller 716 is shown as including a trailing edge detection circuit 724, dimmer conduction detection circuit 759, shaping circuit 726, and drive circuit 730. Further shown in FIG. 7A is input voltage $V_{IN}$ 707, input current $I_{IN}$ 709, output voltage $V_O$ 711, output current $I_O$ 713, output quantity $U_O$ 715, second feedback signal $U_{FB2}$ 717, trailing edge signal $U_{TE}$ 725, first shape signal $U_{S1}$ 727, second shape signal $U_{S2}$ 728, input sense signal 729 (which is representative of the output voltage $V_1$ 719 of the first converter stage 718), first drive signal 731, second drive signal 732, output current $I_1$ 776, output quantity $U_1$ 777, first feedback signal $U_{FB1}$ 778, and a switch current sense 779. It should be appreciated that any converter topology, isolated and non-isolated, may be used for the first or second power converter stages 718 or 720 of lighting driver 710.

Similarly named and numbered elements in FIG. 7A coupled and function as described above with respect to FIG. 1. Further, FIG. 7A and FIG. 7B will discuss reshaping the input current $I_{IN}$ 709 utilizing two power converters as the lighting driver 710 and controller 716. In the illustrated example, the lighting driver 710 includes two dc-dc power converters for providing a regulated output voltage $V_O$ 711, output current $I_O$ 713, or both to the load 712. In some examples, each of the power converter stages includes a power switch 770 and 773, such as a MOSFET, bipolar junction transistor (BJT), insulated-gate bipolar transistor (IGBT), which switches to control the transfer of energy through an energy transfer element 771 and 774, such as an inductor, transformer, or coupled inductor. Specifically, the power switches 770 and 773 may be used to control the amount of current $I_{SW1}$ or $I_{SW2}$ in the energy transfer element (such as an inductor or primary winding of a transformer), and thus, the amount of power transferred to the output of the power converter stages 718 and 720 by switching between an ON state (allowing the switch to conduct current) and an OFF state (preventing the switch from conducting current). The first and second power converter stages 718 and 720 may also include output capacitors 772 and 775 for filtering their respective output voltages $V_1$ 719 and $V_O$ 711. Further, the switch current $I_{SW1}$ may be controlled to reshape the input current $I_{IN}$ 709. In one example, the first power converter stage 718 may be a non-isolated boost converter with a BJT as its power switch 770. In one example, the second power converter stage 720 may be a flyback converter with a MOSFET as the power switch 773. Utilizing two power converter stages may increase the compatibility of the lighting driver 710 with a wider range of dimmer circuits. The first power converter stage 718 may be used to ensure that there is sufficient holding current for the dimmer circuit to remain on and allows for input current shaping. The first power converter stage 718 may also ensure that there is sufficient energy for the second converter stage 720 to regulate the output of the lighting driver 710. The second converter stage 720 may be used to regulate the output of the lighting driver in response to the dimmer circuit.

Further illustrated in FIG. 7A is the switch current sense signal 779, which is representative of either the switch current $I_{SW1}$ through the power switch 770 or the switch current $I_{SW2}$ through the power switch 773. As shown, the drive circuit 730 of the controller 716 is coupled to receive the switch current sense signal 779. As will be discussed further, the switch current sense signal 779 may also be used to reshape the input current $I_{IN}$ 709. Similar to FIG. 3A, the drive circuit 730 is coupled to receive the first and second feedback signals $U_{FB1}$ 778 and $U_{FB2}$ 717, representative of the output quantities $U_1$ 777 and $U_O$ 715 of the first converter stage 718 and the second converter stage 720, respectively. The output quantity $U_1$ 777 may be a voltage or current signal and is representative of the voltage $V_1$ 719, current $I_1$ 776, or both, output by the first power converter stage 718. Similarly the output quantity $U_O$ 715 may be a voltage or current signal and is representative of the voltage $V_O$ 711, current $I_O$ 713, or both, output by the second power converter stage 720.

The controller 716 is shown as including a dimmer conduction detection circuit 759, trailing edge detection circuit 724, shaping circuit 726, and drive circuit 730. The trailing edge detection circuit 724 and the dimmer conduction detection circuit 759 are coupled to receive the input voltage $V_{IN}$ 707, and output the trailing edge signal $U_{TE}$ 725 and dimmer conduction signal $U_{DC}$ 760, respectively. As mentioned above, the trailing edge signal $U_{TE}$ 725 is representative of a trailing edge in $V_{IN}$ 707, and in one example may be a rectangular pulse waveform that pulses to a logic high value when a trailing edge has been detected or will soon be detected. In addition, the dimmer conduction signal $U_{DC}$ 760 is also a rectangular pulse waveform that pulses to a logic high value when it is detected that the dimmer circuit (not shown) is conducting.

When the lighting driver 710 uses two power converters, the shaping circuit 726 receives the input sense signal 729 representative of the voltage $V_1$ 719, which is output by the first converter stage 718. The shaping circuit 726 may output the first shape signal $U_{S1}$ 727 in response to the dimmer conduction signal $U_{DC}$ 760 and the input sense signal 729. Further, the shaping circuit 726 may output the second shape signal $U_{S2}$ 728 in response to the trailing edge signal $U_{TE}$ 725 and the switch current sense signal 779. The first shape signal $U_{S1}$ 727 represents when the drive circuit 730 may output the first drive signal 731 to control switching of the power switch 770 when the dimmer circuit is conducting. Or in other words, the first shape signal $U_{S1}$ 727 may be an enable signal for the drive circuit 730 to output the first drive signal 731. As will be further discussed, the first shape signal $U_{S1}$ 727 may enable the drive circuit 730 to output the first drive signal 731 in response to the voltage $V_1$ 719. In one example, the first shape signal $U_{S1}$ 727 may be rectangular pulse waveforms with varying lengths of logic high and logic low sections. The second shape signal $U_{S2}$ 728 is representative of the current limit for power switch 770 of the first converter stage 718. In operation, the drive circuit 730 turns off the power switch 770 when the current through the power switch $I_{SW1}$ (provided by the switch current sense signal 779) reaches the current limit provided by the second shape signal $U_{S2}$ 728. In one example, the second shape signal $U_{S2}$ 728 may be an increasing waveform when the first shape signal $U_{S1}$ 727 first transitions to a logic high value and becomes substantially constant once the trailing edge has been detected. Further, the second shape signal $U_{S2}$ 728 is substantially zero when the first shape signal $U_{S1}$ 727 is logic low. The increase of the second shape signal $U_{S2}$ 728 may be in a linear or exponential fashion.

The drive circuit 730 is coupled to output the first drive signal 731 to control the switching of the power switch 770, and the second drive signal 732 to control switching of the power switch 773. In response to the first and second feedback signals $U_{FB1}$ 778 and $U_{FB2}$ 717, switch current sense signal 779, and first and second shape signals $U_{S1}$ 727 and $U_{S2}$ 728, the drive circuit 730 may vary one or more switching parameters of the first drive signal 731 and the second drive signal 732. These switching parameters may include the switching frequency, duty ratio, on-time, off-time, and the number of pulses per unit time. In one example, the drive circuit 730 operates the first converter stage 718 in critical conduction mode. The drive circuit 730 turns on the power switch 770 and does not turn off the power switch until the switch current $I_{SW1}$ reaches the current limit provided by the second shape signal $U_{S2}$ 728. The drive circuit 730 turns on the power switch 770 when the switch current $I_{SW1}$ reaches substantially zero. Further, the drive circuit 730 may control the switching of power switch 770 to reshape the input current $I_{IN}$ 709. The drive circuit 730 may also control the second power converter stage 720 such that the second power converter stage 720 provides the appropriate output current $I_O$ 713 or output voltage $V_O$ 711 for the measured conduction angle of the dimmer circuit (not shown).

The controller 716 reshapes the input current $I_{IN}$ 709 by varying the switch current $I_{SW1}$ of the first converter stage 718 in response to the dimmer conduction being detected and a trailing edge has been detected (or will soon be detected). In one example, the controller 716 reshapes the input current $I_{IN}$ 709 by increasing the switch current $I_{SW}$ when a trailing edge has been detected or will soon be detected and/or dimmer conduction has been detected. The switch current $I_{SW1}$ may be increased by increasing one or more parameters (such as switching frequency, on-time, or duty ratio) of the power switch 770 of the first converter stage 718. In one example, a logic high value from the first shape signal $U_{S1}$ 727 corresponds to increasing the switch current $I_{SW1}$ of first converter 718. In one example, the switch current $I_{SW1}$ of first converter 718 may be increased by increasing the duty ratio (from zero). In one example, the controller 716 outputs the first drive signal 731 in response to the first shape signal $U_{S1}$ 727 (i.e., when first shape signal $U_{S1}$ 727 is logic high) and turns off the power switch 770 when the current through the power switch $I_{SW1}$ (provided by the switch current sense signal 779) reaches the current limit provided by the second shape signal $U_{S2}$ 728.

In operation, the shaping circuit 726 asserts the first shape signal $U_{S1}$ 727 (i.e., outputs a logic high value) after a start time $T_{START}$ after the dimmer conduction signal $U_{DC}$ 760 has been asserted and remains logic high until the start of the next half line cycle. The duration of start time $T_{START}$ before the first shape signal $U_{S1}$ 727 is asserted is determined by the voltage $V_1$ 719 provided by the input sense signal 729. In one example, if the voltage $V_1$ 719 when the trailing edge signal $U_{TE}$ 725 is asserted is lower than expected, the shaping circuit 726 decreases the duration of start time $T_{START}$. As such, the first shape signal $U_{S1}$ 727 transitions to a logic high value and the drive circuit 730 may output the first drive signal 731 after the dimmer conduction signal $U_{DC}$ 760 is asserted sooner than the previous half line cycle. If the voltage $V_1$ 719 when the trailing edge signal $U_{TE}$ 725 is asserted is higher than expected, the shaping circuit 726 increases the duration of start time $T_{START}$. As such, the first shape signal $U_{S1}$ 727 transitions to a logic high value, and the drive circuit 730 may output the first drive signal 731 after the dimmer conduction signal $U_{DC}$ 760 is asserted later than the previous half line cycle. The voltage $V_1$ 719 is the input to the second converter stage 720. The first converter stage 718 is maintaining the voltage $V_1$ 719 such that there is enough energy for the second converter stage 720 to regulate the output of the lighting driver 710. If the voltage $V_1$ 719 is too small, there may not be enough energy to properly regulate the output of the lighting driver 710. If the voltage $V_1$ 719 is too large, the lighting driver 710 may not be operating efficiently.

The shaping circuit 726 asserts the second shape signal $U_{S2}$ 728 when the first shape signal $U_{S1}$ 727 is asserted. As mentioned above, the second shape signal $U_{S2}$ 728 is representative of the current limit for the switch current $I_{SW1}$ through power switch 770 of the first converter stage 718. The second shape signal $U_{S2}$ 728 may begin at an initial current threshold $I_{INL}$ and increase until the trailing edge $U_{TE}$ 725 is detected. Once the trailing edge $U_{TE}$ 725 is detected, the second shape signal $U_{S2}$ 728 remains substantially constant until the next half line cycle. In one example, if the current limit provided by the second shape signal $U_{S2}$ 728 is lower than expected when the trailing edge $U_{TE}$ 725 is detected, the initial current threshold $I_{INL}$ is increased for the next half line cycle. If the current limit provided by the second shape signal $U_{S2}$ 728 is greater than expected when the trailing edge $U_{TE}$ 725 is detected, the initial current threshold $I_{INL}$ is decreased for the next half line cycle. As such, the shaping circuit 726 may reshape the input current $I_{EN}$ 709 by controlling the switch current $I_{SW1}$ of power switch 770.

Figure 7B:
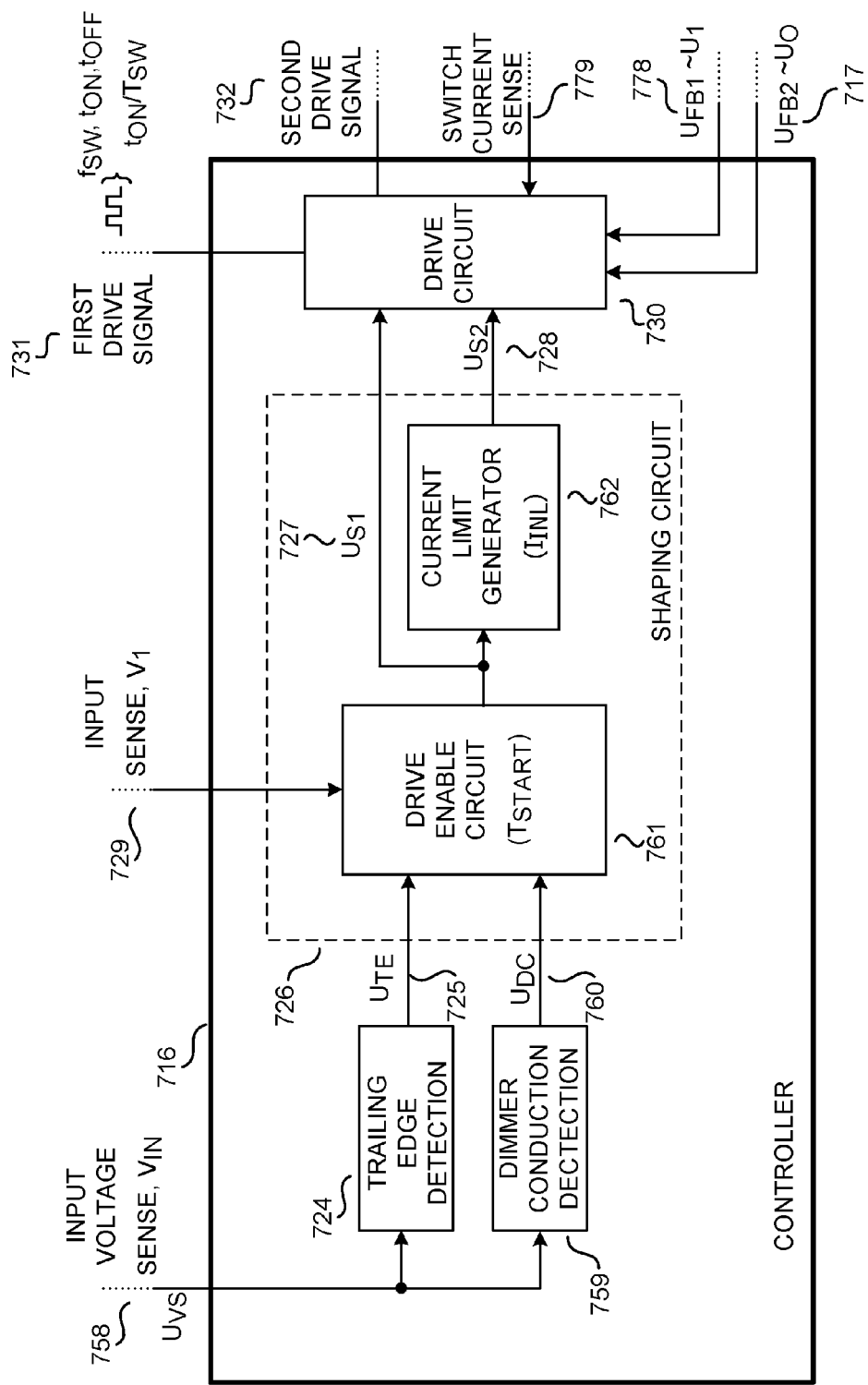
FIG. 7B is a functional block diagram of a shaping circuit of the controller of FIG. 7A in accordance with an example of the present invention.

FIG. 7B is a functional block diagram illustrating the controller 716 and example shaping circuit 726. The controller 716 is shown including trailing edge detection circuit 724, dimmer conduction detection circuit 759, shaping circuit 726, and the drive circuit 730. The shaping circuit 726 is further shown as including drive enable circuit 761 and current limit generator 762. Further illustrated in FIG. 7B are input voltage sense signal $U_{VS}$ 758 (which is representative of the input voltage $V_{IN}$), trailing edge signal $U_{TE}$ 725, dimmer conduction signal $U_{DC}$ 760, input sense signal 729 (which is representative of voltage $V_1$), switch current sense 779, first feedback signal $U_{FB1}$ 778, second feedback signal $U_{FB2}$ 717, first shape signal $U_{S1}$ 727, second shape signal $U_{S2}$ 728, first drive signal 731, and second drive signal 732.

Similarly named and numbered elements are coupled and function as described above with respect to FIG. 1 and FIG. 7A. Further, FIG. 7B illustrates one example of the shaping circuit 726 for reshaping the input current utilizing two power converters for the lighting driver 710. The drive enable circuit 761 of the shaping circuit is coupled to receive the trailing edge signal $U_{TE}$ 725, dimmer conduction signal $U_{DC}$ 760, and the input sense signal 729 and outputs the first shape signal $U_{S1}$ 727. The drive enable circuit 761 determines the start time $T_{START}$ to assert the first shape signal $U_{S1}$ 727 after dimmer conduction is detected ($U_{DC}$ 760). The drive enable circuit 761 determines the start time $T_{START}$ in response to the input sense signal 729 at the time the trailing edge is detected ($U_{TE}$ 725) for the previous half line cycle. Current limit generator 762 is coupled to receive the first shape signal $U_{S1}$ 727 and outputs the second shape signal $U_{S2}$ 728. The current limit generator 762 determines the initial current limit $I_{INL}$ for the second shape signal $U_{S2}$ 728 in response to a previous value of the shape signal $U_{S2}$ 728 when the trailing edge was previously detected ($U_{TE}$ 725).

In operation, the drive enable circuit 761 asserts the first shape signal $U_{S1}$ 727 (i.e., outputs a logic high value) after a start time $T_{START}$ from when the dimmer conduction signal $U_{DC}$ 760 has been asserted (i.e., dimmer conduction has been detected) and remains logic high until the dimmer conduction signal $U_{DC}$ 760 is again asserted (i.e., the start of the next half line cycle). The duration of the start time $T_{START}$ is determined by the voltage $V_1$ 719 provided by the input sense signal 729. In one example, if the voltage $V_1$ 719 when the trailing edge signal $U_{TE}$ 725 is asserted is lower than expected, the shaping circuit 726 decreases the duration of the next start time $T_{START}$. As such the first shape signal $U_{S1}$ 727 transitions to a logic high value (and the drive circuit 730 may output the first drive signal 731) after the dimmer conduction signal $U_{DC}$ 760 is asserted sooner than the previous half line cycle. If the voltage $V_1$ 719 when the trailing edge signal $U_{TE}$ 725 is asserted is higher than expected, the shaping circuit 726 increases the duration of the next start time $T_{START}$. As such the first shape signal $U_{S1}$ 727 transitions to a logic high value (and the drive circuit 730 may output the first drive signal 731) after the dimmer conduction signal $U_{DC}$ 760 is asserted later than the previous half line cycle. By varying the duration of start time $T_{START}$, the controller 716 helps ensure that the voltage $V_1$ 719 when the trailing edge occurs is sufficient enough for the second converter stage 720 to produce a constant output (such as output current $I_O$ 713 or output voltage $V_O$ 711).

The current limit generator 762 asserts the second shape signal $U_{S2}$ 728 in response to the first shape signal $U_{S1}$ 727. As mentioned above, the second shape signal $U_{S2}$ 728 is representative of the current limit for the switch current $I_{SW1}$ through power switch 770 of the first converter stage 718. The second shape signal $U_{S2}$ 728 may begin at an initial current threshold $I_{INL}$ and increases while asserted until the trailing edge $U_{TE}$ 725 is detected. The second shape signal $U_{S2}$ 728 may increase in a linear or exponential fashion. The value of the initial current threshold $I_{INL}$ is partially determined by the value of the current limit provided by the second shape signal $U_{S2}$ 728 at the time that the trailing edge is detected. In one example, if the current limit provided by the second shape signal $U_{S2}$ 728 is lower than expected when the trailing edge $U_{TE}$ 725 is detected, the initial current threshold $I_{INL}$ is increased for the next half line cycle. If the current limit provided by the second shape signal $U_{S2}$ 728 is greater than expected when the trailing edge $U_{TE}$ 725 is detected, the initial current threshold $I_{INL}$ is decreased for the next half line cycle. Once the trailing edge $U_{TE}$ 725 is detected, the second shape signal $U_{S2}$ 728 remains constant until the first shape signal $U_{S1}$ 727 transitions to a logic low value (i.e., at the start of the next half line cycle). As such, the shaping circuit 726 may reshape the input current $I_{IN}$ 709 by controlling the switch current $I_{SW1}$ of power switch 770. By reshaping the input current, the controller 716 may more accurately detect the trailing edge.

Figure 8:
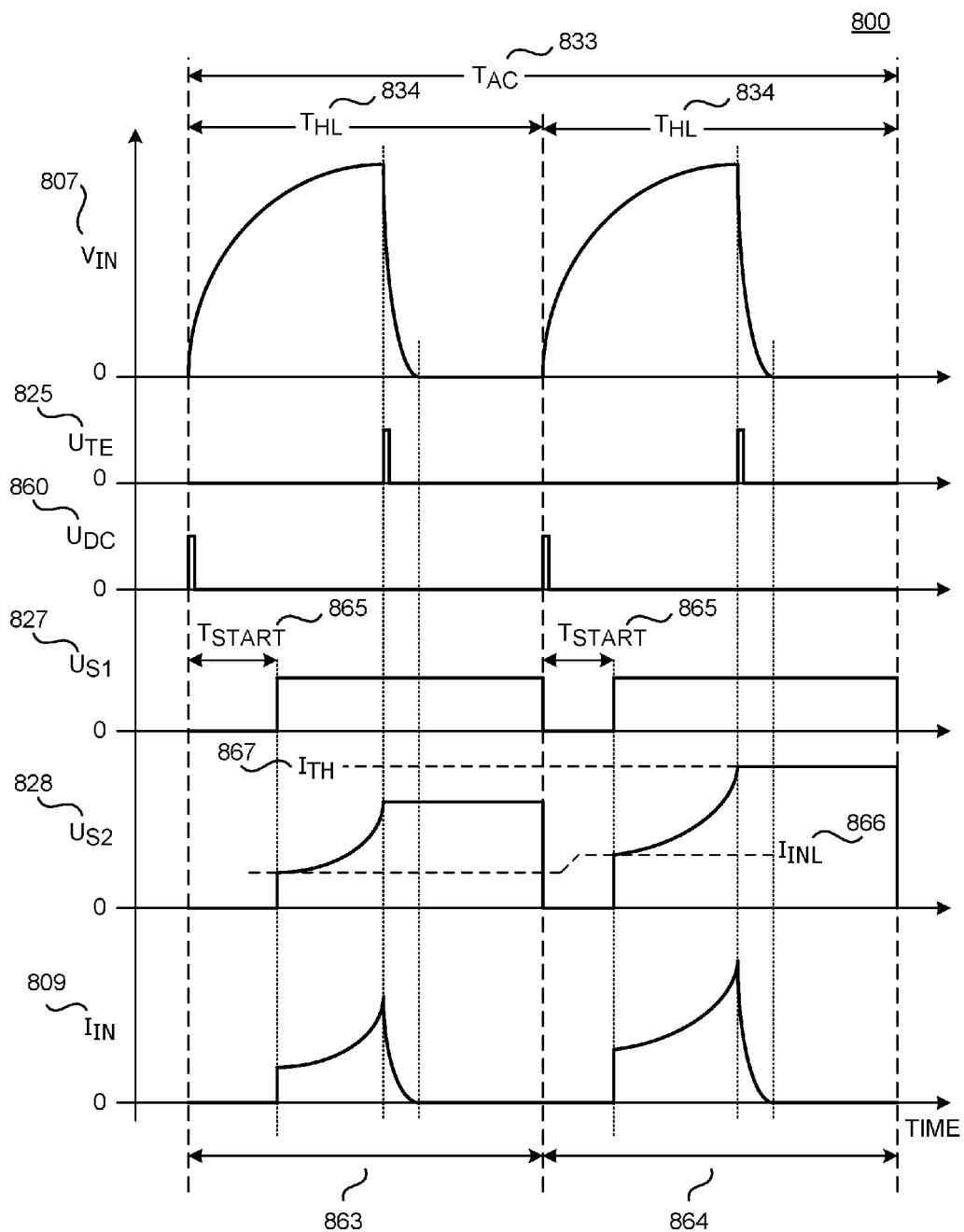
FIG. 8 is timing diagram illustrating various signals of the controller of FIG. 7B when a trailing edge dimmer circuit is utilized in accordance with an example of the present invention.

FIG. 8 is a timing diagram 800 illustrating example waveforms of the various signals of the lighting system 700 and controller 716 of FIG. 7A and FIG. 7B when a trailing edge dimmer circuit is utilized. FIG. 8 illustrates example waveforms for the input voltage $V_{IN}$ 807, trailing edge signal $U_{TE}$ 825, dimmer conduction signal $U_{DC}$ 860, first shape signal $U_{S1}$ 827, second shape signal $U_{S2}$ 828, and the input current $I_{IN}$ 809. It should be appreciated that similarly named and numbered elements are coupled and function as described above.

FIG. 8 illustrates one full line cycle $T_{AC}$ 833, or two half line cycles $T_{HL}$ 834 of the input voltage $V_{IN}$ 807 when a trailing edge dimmer circuit is used. At the beginning of the first half line cycle 863, the trailing edge dimmer is conducting and the input voltage $V_{IN}$ 807 increases. In particular, the input voltage $V_{IN}$ 807 substantially follows the ac input voltage $V_{AC}$. The dimmer conduction signal $U_{DC}$ 860 pulses to a logic high value at the beginning of the first half line cycle 863, indicating that the dimmer conduction detection circuit detected that the trailing edge dimmer circuit is conducting. The first shape signal $U_{S1}$ 827 remains logic low for a start time $T_{START}$ 865 after the logic high pulse of the dimmer conduction signal $U_{DC}$ 860. As previously discussed, the duration of start time $T_{START}$ 865 may be determined by the output voltage $V_1$ (output from the first converter stage) at the time the trailing edge was detected for the previous half line cycle. Since the first shape signal $U_{S1}$ 827 is logic low for the start time $T_{START}$ 865, the second shape signal $U_{S2}$ 828 is also logic low for the duration of start time $T_{START}$ 865. The first shape signal $U_{S1}$ 827 determines when the controller 716 outputs the first drive signal 731 to control switching of the power switch 770 of the first converter stage 718. As such, when the first shape signal $U_{S1}$ 827 is logic low during the start time $T_{START}$ 865, the power switch 770 of the first converter stage 718 is not switching (i.e., is off) and the input current $I_{IN}$ 809 is substantially equal to zero.

At the end of the start time $T_{START}$ 865, the first shape signal $U_{S1}$ 827 transitions to a logic high value for a duration until the next half line cycle 864, and the second shape signal $U_{S2}$ 828 increases from zero to the initial current $I_{INL}$ 866. As illustrated, the second shape signal $U_{S2}$ 828 increases in an exponential fashion. In one example, the characteristics of how the second shape signal $U_{S2}$ 828 increases may be determined by an RC-circuit included in the current limit generator 762. The first converter stage 718 operates in critical conduction mode. When the power switch 770 turns on, the switch current $I_{SW1}$ increases until it reaches the current limit (second shape signal $U_{S2}$ 828). Once the current limit is reached, the power switch 770 is turned off and the switch current $I_{SW1}$ decreases to zero. The power switch 770 turns on when the switch current $I_{SW1}$ reaches zero. As such, the envelope of the switch current $I_{SW1}$ and the input current $I_{IN}$ 809 substantially follows the current limit provided by the second shape signal $U_{S2}$ 828 when the dimmer circuit is conducting.

The trailing edge signal $U_{TE}$ 825 pulses to a logic high value when the trailing edge is detected. Once the trailing edge signal $U_{TE}$ 825 transitions to a logic high value, the second shape signal $U_{S2}$ 828 remains constant for a duration until the next half line cycle 864. The current limit is held constant at the value of the second shape signal $U_{S2}$ 828 when the trailing edge is detected and the power switch 770 remains on to help decrease the input voltage $V_{IN}$ 807. Since the input voltage $V_{IN}$ 807 is decreasing, the input current $I_{IN}$ 809 also falls to zero.

During the first half cycle 863, the second shape signal $U_{S2}$ 828 does not reach the peak current threshold $I_{TH}$ 867 by the time the trailing edge is detected. In one example the peak current threshold $I_{TH}$ 867 is the peak current limit of the power switch. Further, the voltage $V_1$ 719 may also be lower than expected when the trailing edge is detected. As such, during the second half line cycle 864 the duration of the start time $T_{START}$ 865 may decrease such that the shape signal $U_{S1}$ 827 transitions to a logic high value sooner after the pulse in the dimmer conduction signal $U_{DC}$ 860 as compared to the first half cycle 863. By transitioning sooner, the voltage $V_1$ 719 at the time the trailing edge is next detected may increase. However, if the voltage $V_1$ 719 is greater than expected when the trailing edge is detected, duration of the start time $T_{START}$ 865 may increase. If the voltage $V_1$ 719 is substantially equal to the expected value, the start time $T_{START}$ 865 would remain the same for the next half line cycle. In addition, the initial current $I_{INL}$ 866 may also increase for the second half cycle 864 as compared to the first half cycle 863. By increasing the initial current $I_{INL}$ 866, the second shape signal $U_{S2}$ 828 may reach the peak current threshold $I_{TH}$ 867 when the trailing edge is detected. For the example shown, the second shape signal $U_{S2}$ 828 is substantially equal to the peak current threshold $I_{TH}$ 867 at the time the trailing edge is detected during the second half line cycle 864. As such, the initial current $I_{INL}$ 866 would remain the same for the next half line cycle. If the second shape signal $U_{S2}$ 828 is greater than the peak current threshold $I_{TH}$ 867 when the trailing edge is detected, the initial current $I_{INL}$ 866 for the next half line cycle may be decreased.

Figure 9:
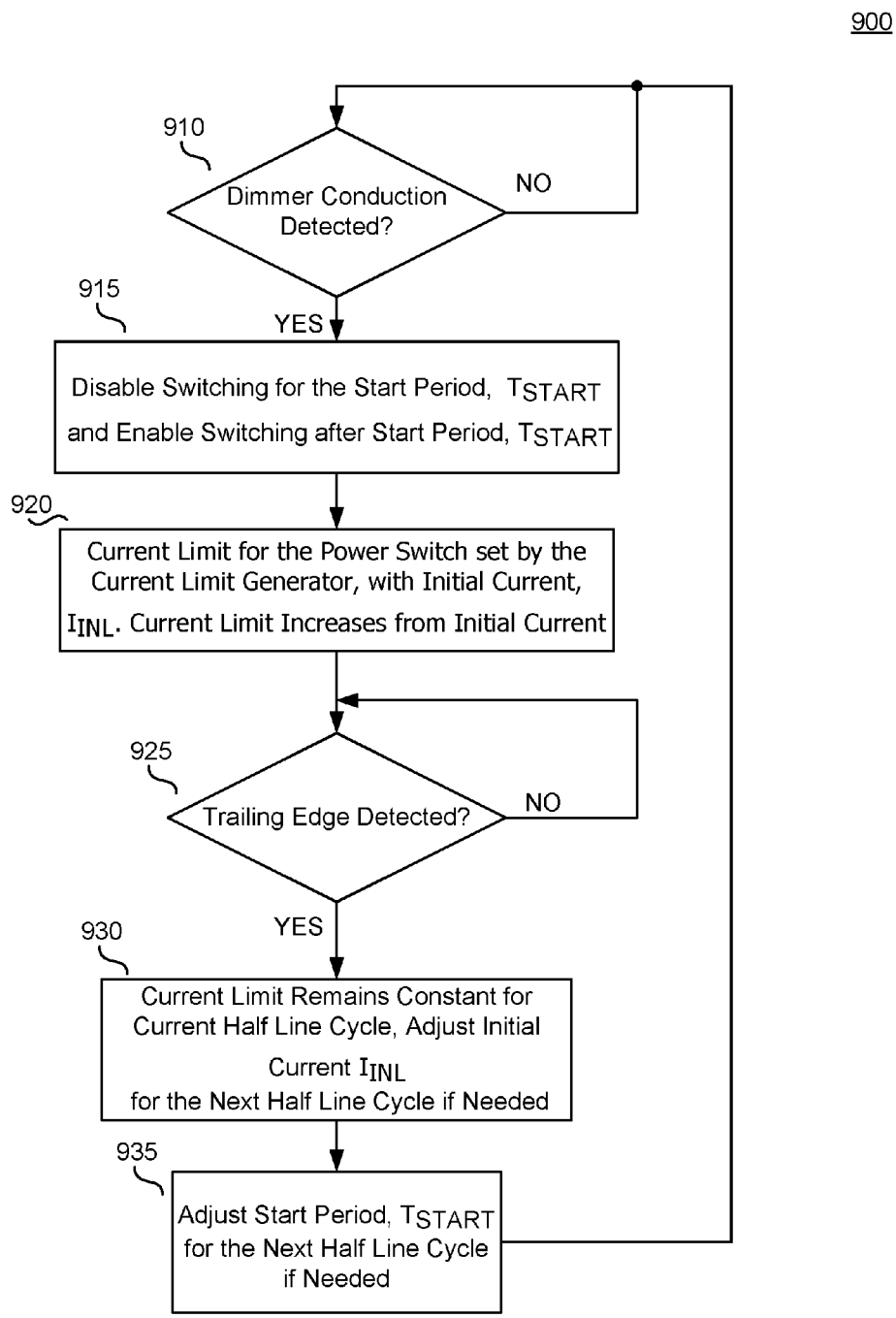
FIG. 9 is a flow diagram illustrating an example method for determining when to increase the switch current in accordance with an example of the present invention.

FIG. 9 is a flow diagram 900 illustrating an example method for determining when to increase the switch current in accordance with examples of the present invention. The process starts at decision block 910 and it is determined if dimmer conduction is detected. If the dimmer conduction is not detected, the process remains at block 910. If dimmer conduction is detected, the process continues to block 915. At block 915, the switching of the power switch is disabled for the start period, $T_{START}$ and enabled after the start period, $T_{START}$. At block 920, the current limit is set for the power switch by the current limit generator with an initial current, $I_{INL}$. The current limit then increases from the initial current, $I_{INL}$.

The process continues to decision block 925 and it is determined if the trailing edge is detected. If the trailing edge is not detected, the process stays at block 925. If the trailing edge is detected, the process continues to block 930.

At block 930, the current limit is held constant for the duration of the half line cycle and the initial current $I_{INL}$ is adjusted if needed for the next half line cycle. At block 935, the start time $T_{START}$ is adjusted if needed for the next half line cycle. At that point, the process returns to block 910.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
    a first edge detection circuit coupled to receive a first input sense signal representative of an input of the power converter coupled to a dimmer circuit, wherein the first edge detection circuit is coupled to generate a first edge detection signal in response to the first input sense signal;
    a shaping circuit coupled to receive the first edge detection signal from the first edge detection circuit, wherein the shaping circuit is coupled to generate a first shape signal in response to the first edge detection signal;
    a drive circuit coupled to receive the first shape signal from the shaping circuit and a feedback signal representative of an output of the power converter, wherein the drive circuit is coupled to generate a drive signal in response to the feedback signal to control switching of a power switch of the power converter to control a transfer of energy from the input of the power converter to the output of the converter, wherein the drive circuit is further coupled to switch the power switch in a first higher current mode to increase a current through the power switch for a first duration in response to the first shape signal; and
    a second edge detection circuit coupled to receive the first input sense signal, wherein the second edge detection circuit is coupled to generate a second edge detection signal in response to the first input sense signal,
    wherein the shaping circuit is further coupled to receive the second edge detection signal from the second edge detection circuit, wherein the shaping circuit is coupled to generate a second shape signal in response to the second edge detection signal, and
    wherein the drive circuit is further coupled to receive the second shape signal from the shaping circuit, wherein the drive circuit is further coupled to switch the power switch in a second higher current mode for a second duration in response to the second shape signal.

2. The controller of claim 1, wherein the drive circuit is coupled to switch the power switch with at least one of a first increased frequency or a first increased duty ratio to increase the current through the power switch in the first higher current mode.

3. The controller of claim 1, wherein the drive circuit is coupled to switch the power switch with a peak current threshold in the first higher current mode.

4. The controller of claim 1, wherein the shaping circuit comprises a one shot coupled to receive the first edge detection signal, wherein the first shape signal is coupled to be responsive to an output of the one shot.

5. The controller of claim 1, wherein the shaping circuit comprises:
   a first comparator coupled to receive the first input sense signal, wherein the first comparator is coupled to compare the first input sense signal to a first threshold; and
   an OR gate having a first input coupled to be responsive to the first edge detection circuit, and a second input coupled to be responsive to an output of the first comparator, wherein the first shape signal is generated at an output of the OR gate in response to the first edge detection signal or a comparison of the first input sense signal to the first threshold.

6. The controller of claim 5, wherein the shaping circuit further comprises:
   a second comparator coupled to receive the first input sense signal, wherein the second comparator is coupled to compare the first input sense signal to a second threshold, wherein the second threshold is less than the first threshold; and
   a first pulse generator coupled to receive the first edge detection signal, the output of the first comparator, and an output of the second comparator, wherein an output of the first pulse generator is coupled to be received at the second input of the OR gate such that the first shape signal is generated at the output of the OR gate in response to the first edge detection signal or the output of the first pulse generator.

7. The controller of claim 1, wherein the first edge detection circuit is coupled to generate the first edge detection signal in response to a detection of a leading edge of a half line cycle in the first input sense signal, and wherein the drive circuit is coupled to switch the power switch in the first higher current mode for the first duration during the leading edge of the half line cycle in the first input sense signal in response to the first shape signal.

8. The controller of claim 1, wherein the drive circuit is coupled to switch the power switch at a first increased frequency in the first higher current mode, wherein the drive circuit is coupled to switch the power switch at a second increased frequency in the second higher current mode, and wherein the first increased frequency is greater than the second increased frequency.

9. The controller of claim 1, wherein the shaping circuit further comprises a second pulse generator having a first input coupled to be responsive to an output of the second comparator, and a second input coupled to the second edge detection circuit such that the second shape signal is generated at an output of the second pulse generator in response to the output of the second edge detection circuit and the second comparator.

10. The controller of claim 1, wherein the second edge detection circuit is coupled to generate the second edge detection signal in response to a detection of a trailing edge of a half line cycle in the first input sense signal, and wherein the drive circuit is coupled to switch the power switch in the second higher current mode for the second duration during the trailing edge of the half line cycle in the first input sense signal in response to the second shape signal.

11. The controller of claim 1, wherein the first input sense signal is representative of an input voltage coupled to be received at the input of the power converter from the dimmer circuit.

12. The controller of claim 1, wherein the first input sense signal is representative of an input current coupled to be received at the input of the power converter from the dimmer circuit.

13. A controller for use in a power converter, comprising:
   a first edge detection circuit coupled to receive a first input sense signal representative of an input of the power converter coupled to a dimmer circuit, wherein the first edge detection circuit is coupled to generate a first edge detection signal in response to the first input sense signal;
   a shaping circuit coupled to receive the first edge detection signal from the first edge detection circuit, wherein the shaping circuit is coupled to generate a first shape signal in response to the first edge detection signal;
   a drive circuit coupled to receive the first shape signal from the shaping circuit and a feedback signal representative of an output of the power converter, wherein the drive circuit is coupled to generate a drive signal in response to the feedback signal to control switching of a power switch of the power converter to control a transfer of energy from the input of the power converter to the output of the converter, wherein the drive circuit is further coupled to switch the power switch in a first higher current mode to increase a current through the power switch for a first duration in response to the first shape signal; and
   a dimmer conduction detection circuit coupled to receive the first input sense signal, wherein the dimmer conduction detection circuit is coupled to generate a dimmer conduction signal in response to the first input sense signal,
   wherein the shaping circuit is coupled to receive the dimmer conduction signal from the dimmer conduction detection circuit, wherein the drive circuit is further coupled to switch the power switch in the first higher current mode in response to the dimmer conduction signal.

14. The controller of claim 13, wherein the shaping circuit comprises:
   a drive enable circuit coupled to receive the first edge detection signal from the first edge detection circuit, the dimmer conduction signal from the dimmer conduction detection circuit, and a second input sense signal representative of an output voltage of one of a plurality of power converter stages of the power converter, wherein the drive enable circuit is coupled to generate the first shape signal in response to the first edge detection signal, the dimmer conduction signal, and the second input sense signal; and
   a current limit generator coupled to receive the first shape signal from the drive enable circuit, wherein the current limit generator is coupled to generate a second shape signal in response to the first shape signal,
   wherein the drive circuit is coupled to receive the first shape signal, the second shape signal, the feedback signal representative of an output of the power converter, and a second feedback signal representative of the output of said one of the plurality of power converter stages of the power converter, wherein the drive circuit is further coupled to generate a second drive signal to control switching of a second power switch of said one of the plurality of power converter stages of the power converter.

15. The controller of claim 14, wherein the drive enable circuit is coupled to determine a start period of when to assert the first shape signal in response to the first edge detection signal, the dimmer conduction signal, and the second input sense signal.

16. The controller of claim 14, wherein the current limit generator is coupled to determine an initial current limit for the second shape signal in response to a previous value of the second shape signal when an edge was previously detected by the first edge detection circuit.

17. The controller of claim 14, wherein the current limit generator is coupled to increase a current limit for the second shape signal until an edge is detected by the first edge detection circuit.

18. The controller of claim 14, wherein the first edge detection signal from the first edge detection circuit is a trailing edge detection signal from a trailing edge detection circuit.

19. A method of switching a power switch of a power converter, comprising:
    receiving a feedback signal representative of an output of the power converter;
    generating a drive signal coupled to the power switch of the power converter in response to the feedback signal to control switching of the power switch to control a transfer of energy from an input of the power converter to the output of the converter,
    sensing a first input sense signal representative of the input of the power converter coupled to a dimmer circuit;
    detecting a first edge in the first input sense signal; and
    switching the power switch in a first higher current mode to increase a current through the power switch for a first duration in response to said detecting the first edge in the first input sense signal, wherein said switching the power switch in the first higher current mode for the first duration includes switching the power switch for a predetermined length of time.

20. The method of claim 19, wherein said switching the power switch in the first higher current mode for the first duration further comprises switching the power switch in the first higher current mode when the first input sense signal is greater than a first threshold and less than a second threshold.

21. The method of claim 19, further comprising:
    detecting a second edge in the first input sense signal; and
    switching the power switch in a second higher current mode for a second duration in response to said detecting the second edge in the first input sense signal.

22. The method of claim 21, wherein said switching the power switch in the second higher current mode for the second duration further comprises switching the power switch in the second higher current mode until the first input sense signal is less than a first threshold.

23. The method of claim 19, wherein the first input sense signal is representative of at least one of an input voltage or an input current coupled to be received at the input of the power converter from the dimmer.

24. The method of claim 19, wherein said switching the power switch in the first higher current mode comprises switching the power switch in at least one of a first increased frequency or a first increased duty ratio.

25. The method of claim 19, wherein said switching the power switch in the first higher current mode comprises switching the power switch with a peak current threshold.

26. The method of claim 19, further comprising:
    detecting conduction of a dimmer coupled to the power converter;
    disabling said switching of the power switch for a start period in response to detecting the conduction of the dimmer;
    enabling said switching of the power switch after said start period;
    increasing a current limit of the power switch after said enabling said switching the power switch;
    detecting a trailing edge in the first input sense signal;
    holding the current limit constant for a duration of a half line cycle after said detecting the trailing edge in the first input sense signal.

27. The method of claim 26, further comprising adjusting an initial current limit of the power switch for a next half line cycle in the first input sense signal if needed.

28. The method of claim 26, further comprising adjusting the start period for a next half line cycle in the first input sense signal.

* * * * *